(12) United States Patent
Yang et al.

(10) Patent No.: US 10,778,294 B2
(45) Date of Patent: Sep. 15, 2020

(54) CHANNEL STATE INFORMATION FEEDBACK METHOD, TERMINAL DEVICE, AND NETWORK DEVICE

(71) Applicant: Huawei Technologies Co., Ltd., Shenzhen (CN)

(72) Inventors: Ye Yang, Shanghai (CN); Bailong Su, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/523,409

(22) Filed: Jul. 26, 2019

(65) Prior Publication Data
US 2019/0349035 A1 Nov. 14, 2019

Related U.S. Application Data

(63) Continuation of application No. PCT/CN2017/072731, filed on Jan. 26, 2017.

(51) Int. Cl.
*H04B 7/0417* (2017.01)
*H04B 7/0456* (2017.01)
*H04B 7/06* (2006.01)

(52) U.S. Cl.
CPC ........... *H04B 7/0417* (2013.01); *H04B 7/046* (2013.01); *H04B 7/0626* (2013.01); *H04B 7/0634* (2013.01)

(58) Field of Classification Search
CPC ..................................................... H04B 7/0417
(Continued)

(56) References Cited

U.S. PATENT DOCUMENTS

| 6,907,270 B1 * | 6/2005 | Blanz | H04L 25/0248 455/562.1 |
| 7,684,761 B2 * | 3/2010 | Hottinen | H04B 7/0408 455/69 |

(Continued)

FOREIGN PATENT DOCUMENTS

| CN | 104539335 A | 4/2015 |
| CN | 104683074 A | 6/2015 |

(Continued)

OTHER PUBLICATIONS

"High Resolution CSI feedback," 3GPP TSG-RAN WG1#85, Nanjing, China, R1-165100, pp. 1-8, 3rd Generation Partnership Project, Valbonne, France (May 23-27, 2016).

(Continued)

*Primary Examiner* — Lihong Yu
(74) *Attorney, Agent, or Firm* — Leydig, Voit & Mayer, Ltd.

(57) ABSTRACT

Embodiments of the present invention provide a channel state information feedback method, a terminal device, and a network device. The method includes: sending, by a terminal device, matrix information of a dimension reduction matrix to a network device, where a first dimension of the dimension reduction matrix is the same as a quantity of transmit antenna ports of the network device, and a second dimension of the dimension reduction matrix is less than the first dimension of the dimension reduction matrix; and sending, by the terminal device, vector information of an eigenvector of a downlink equivalent channel to the network device, where the eigenvector of the downlink equivalent channel is obtained based on the dimension reduction matrix.

15 Claims, 7 Drawing Sheets

(58) Field of Classification Search
USPC .......................................................... 375/267
See application file for complete search history.

(56) References Cited

U.S. PATENT DOCUMENTS

| | | | |
|---|---|---|---|
| 9,755,719 B2* | 9/2017 | Kim | .................. H04B 7/06 |
| 2009/0080546 A1 | 3/2009 | Zhao et al. | |
| 2009/0239551 A1* | 9/2009 | Woodsum | ............. H04B 7/086 |
| | | | 455/456.1 |
| 2013/0163645 A1* | 6/2013 | Kuo | .................. H04B 7/0663 |
| | | | 375/219 |
| 2016/0294457 A1 | 10/2016 | Lee et al. | |
| 2018/0123671 A1 | 5/2018 | Wu et al. | |

FOREIGN PATENT DOCUMENTS

| | | |
|---|---|---|
| CN | 105763234 A | 7/2016 |
| CN | 105827293 A | 8/2016 |
| CN | 106160938 A | 11/2016 |
| KR | 20160030457 A | 3/2016 |
| WO | 2017000258 A1 | 1/2017 |

OTHER PUBLICATIONS

"Advanced CSI Feedback Framework for LTE," 3GPP TSG RAN WG1 Meeting #86, Gothenburg, Sweden, R1-166139, pp. 1-7, 3rd Generation Partnership Project, Valbonne, France (Aug. 22-26, 2016).
CN/2017800833214, Search Report, dated May 8, 2020.
KR/20197023791, Office Action, dated May 25, 2020.

\* cited by examiner

CHANNEL STATE INFORMATION FEEDBACK METHOD, TERMINAL DEVICE, AND NETWORK DEVICE

CROSS-REFERENCE TO RELATED APPLICATIONS

This application is a continuation of International Application No. PCT/CN2017/072731, filed on Jan. 26, 2017, the disclosure of which is hereby incorporated by reference in its entirety.

TECHNICAL FIELD

Embodiments of the present invention relate to the wireless communications field, and more specifically, to a channel state information feedback method, a terminal device, and a network device.

BACKGROUND

Massive multiple-input multiple-output (Massive MIMO) is a well-known key technology of 5G (the 5th generation mobile communication) in the industry. A system capacity in the Massive MIMO technology is increased because of utilization of a high spatial degree of freedom in the Massive MIMO technology, so that multi-user spatial multiplexing can be performed to obtain a gain. To obtain a higher gain of spatial multiplexing, a network device needs to obtain accurate channel state information (CSI).

Currently, a method for obtaining CSI by a network device includes: sending, by the network device, a channel state information—reference signal (CSI-RS) to a terminal device; and performing, by the terminal device, channel estimation based on the CSI-RS sent by the network device, selecting a precoding matrix from a stored codebook based on an estimation result, and feeding back an index of the selected precoding matrix in the codebook to the network device over an uplink channel, where the index is denoted as a precoding matrix indicator (PMI). The precoding matrix selected by the terminal device is used to represent the CSI.

This mechanism limits accuracy of the CSI represented by the precoding matrix, and consequently, the network device cannot obtain accurate CSI.

SUMMARY

Embodiments of the present invention provide a channel state information feedback method, a terminal device, and a network device, so that the network device can obtain accurate CSI.

According to a first aspect, a channel state information feedback method is provided. The method includes: sending, by a terminal device, matrix information of a dimension reduction matrix to a network device, where a first dimension of the dimension reduction matrix is the same as a quantity of transmit antenna ports of the network device, and a second dimension of the dimension reduction matrix is less than the first dimension of the dimension reduction matrix; and sending, by the terminal device, vector information of an eigenvector of a downlink equivalent channel to the network device, where the eigenvector of the downlink equivalent channel is obtained based on the dimension reduction matrix, where the matrix information includes a matrix index of the dimension reduction matrix, or the matrix information includes information obtained by the terminal device by quantizing an element of the dimension reduction matrix; and the vector information includes an index of the eigenvector, or the vector information includes information obtained by the terminal device by quantizing an element of the eigenvector.

In the prior art, a precoding matrix determined from a codebook is used to represent CSI. In comparison, the method in this embodiment of the present invention is not limited to a codebook technology. A dimension reduction matrix and an eigenvector are used to jointly represent CSI, so that CSI is accurately represented, and the network device can obtain accurate CSI.

Optionally, in a possible implementation of the first aspect, the first dimension is a row dimension, and the second dimension is a column dimension.

Optionally, in a possible implementation of the first aspect, the dimension reduction matrix is used to perform dimension reduction on a transmit antenna port of the network device in a channel matrix of the network device.

Optionally, in a possible implementation of the first aspect, the dimension reduction matrix is used to perform dimension reduction on a channel matrix corresponding to a downlink reference signal.

Optionally, in a possible implementation of the first aspect, the dimension reduction matrix is used to perform dimension reduction on a channel matrix corresponding to a downlink reference signal received in a second time period.

Optionally, in a possible implementation of the first aspect, the eigenvector of the downlink equivalent channel is used to represent a channel status of the downlink equivalent channel, and the dimension reduction matrix and the eigenvector of the downlink equivalent channel are used to represent a channel status of a downlink channel.

In a possible implementation of the first aspect, at least one of the matrix information of the dimension reduction matrix and the vector information of the eigenvector is sent over an uplink data channel.

If the dimension reduction matrix is obtained by the terminal device through calculation based on an actual status of the downlink channel, the dimension reduction information occupies a relatively large quantity of bits, and can be better transmitted over an uplink data channel. Likewise, if the eigenvector is obtained by the terminal device through calculation based on an actual status of the downlink channel, the vector information can be better transmitted over an uplink data channel. A matching transmission channel is selected based on actual statuses of the matrix information and the vector information, so that the terminal device can send the matrix information and the vector information to the network device.

In a possible implementation of the first aspect, the dimension reduction matrix is determined by the terminal device based on channel matrices corresponding to downlink reference signals received in a first time period, energy of a subspace corresponding to the dimension reduction matrix in the first time period is highest among energy of a plurality of subspaces corresponding to the downlink channel in a same dimension, and orthogonality is met between column vectors of the dimension reduction matrix.

In the first time period, energy of the downlink channel is mainly concentrated in the subspace corresponding to the dimension reduction matrix. Dimension reduction performed by using the dimension reduction matrix enables the channel status of the downlink equivalent channel to more accurately represent the channel status of the downlink channel, so as to improve CSI feedback accuracy.

In a possible implementation of the first aspect, the method further includes: determining, by the terminal device, the dimension reduction matrix based on the channel matrices corresponding to the downlink reference signals received in the first time period.

The terminal device may determine the dimension reduction matrix based on a statistical feature of the downlink channel within the first time period, so that the dimension reduction matrix can be used to perform dimension reduction on a channel matrix at a low loss.

In a possible implementation of the first aspect, the determining, by the terminal device, the dimension reduction matrix based on the channel matrices corresponding to the downlink reference signals received in the first time period includes: calculating, by the terminal device, a first covariance matrix based on the channel matrices corresponding to the downlink reference signals received in the first time period, where the first covariance matrix is used to represent a statistical feature that is of the downlink channel and that is corresponding to the first time period; and calculating, by the terminal device, the dimension reduction matrix based on the first covariance matrix.

A first covariance matrix can represent a statistical feature that is of the downlink channel and that is corresponding to a time period, so that the dimension reduction matrix determined by the terminal device can be used to perform dimension reduction on a channel matrix corresponding to a time period, in other words, the terminal device does not need to frequently determine the dimension reduction matrix, and accordingly, the terminal device does not need to frequently send the dimension reduction matrix, thereby reducing CSI feedback overheads.

In a possible implementation of the first aspect, the calculating, by the terminal device, a first covariance matrix based on the channel matrices corresponding to the downlink reference signals received in the first time period includes: calculating, by the terminal device, a covariance matrix of each of the channel matrices corresponding to the downlink reference signals received by the terminal device in the first time period; averaging, by the terminal device, covariance matrices corresponding to downlink reference signals received at a same moment, to obtain a plurality of second covariance matrices, where the plurality of second covariance matrices are in a one-to-one correspondence with a plurality of moments included in the first time period; and performing, by the terminal device, averaging or time-domain filtering on the plurality of second covariance matrices to obtain the first covariance matrix.

The first covariance matrix obtained by using the method can more accurately represent the statistical feature that is of the downlink channel and that is corresponding to the first time period, thereby helping the terminal device determine the dimension reduction matrix.

Optionally, a second covariance matrix is used to represent a statistical feature, of the downlink channel, at a corresponding moment.

In a possible implementation of the first aspect, the determining, by the terminal device, the dimension reduction matrix of a downlink channel based on the channel matrices corresponding to the downlink reference signals received in the first time period includes: determining, by the terminal device, the dimension reduction matrix from a preset dimension reduction matrix set based on the channel matrices corresponding to the downlink reference signals received in the first time period, where the matrix information of the dimension reduction matrix includes an index of the dimension reduction matrix in the preset dimension reduction matrix set.

The dimension reduction matrix is selected by the terminal device from the preset dimension reduction matrix set, the matrix information includes the index, and the solution helps reduce feedback overheads. Further, in this solution, complexity of determining the dimension reduction matrix by the terminal device can be reduced. This helps the terminal device feed back the matrix information.

In a possible implementation of the first aspect, all columns of the dimension reduction matrix are corresponding to a same beam directivity pattern.

All the columns of the dimension reduction matrix are corresponding to the same beam directivity pattern, and energy for receiving a channel on one beam is similar to energy for receiving a channel on another beam, so that CSI feedback overheads are reduced when vector information of a low-dimension downlink equivalent channel is subsequently transmitted.

In a possible implementation of the first aspect, the method further includes: performing, by the terminal device based on the dimension reduction matrix, dimension reduction on channel matrices corresponding to downlink reference signals received at a first moment, to determine eigenvectors of downlink equivalent channels corresponding to the downlink reference signals received at the first moment.

An eigenvector is obtained by the terminal device through calculation based on an actual status of the downlink channel, so that the eigenvector can more accurately represent a channel status of a downlink equivalent channel, and the network device can obtain an accurate downlink channel status.

Optionally, in a possible implementation of the first aspect, the performing, by the terminal device based on the dimension reduction matrix, dimension reduction on channel matrices corresponding to downlink reference signals received at a first moment, to determine eigenvectors of downlink equivalent channels includes: performing, by the terminal device based on the dimension reduction matrix, dimension reduction on the channel matrices corresponding to the downlink reference signals received at the first moment, to determine an eigenvector of the downlink channel at the first moment of the second time period, where the second time period is later than the first time period.

The dimension reduction matrix determined by the terminal device may be used to perform dimension reduction on a channel matrix of the second time period, that is, the dimension reduction matrix determined by the terminal device may be used to perform dimension reduction on channel matrices corresponding to downlink reference signals received by the terminal device a plurality of times within a time period, in other words, the terminal device does not need to frequently determine the dimension reduction matrix. This helps reduce CSI feedback overheads.

In a possible implementation of the first aspect, the performing, by the terminal device based on the dimension reduction matrix, dimension reduction on channel matrices corresponding to downlink reference signals received at a first moment, to determine eigenvectors of downlink equivalent channels corresponding to the downlink reference signals received at the first moment includes: performing, by the terminal device based on the dimension reduction matrix, dimension reduction on the channel matrices corresponding to the downlink reference signals received at the first moment, to obtain equivalent matrices corresponding to the downlink reference signals received at the first moment; calculating, by the terminal device, a covariance matrix of each of the equivalent matrices corresponding to the downlink reference signals received at the first moment; averaging, by the terminal device, covariance matrices corresponding to a first frequency domain resource area to obtain a third covariance matrix corresponding to the first resource area, where the covariance matrices corresponding to the first frequency domain resource area include the covariance matrices of the equivalent matrices corresponding to the downlink reference signals received at the first moment in the first frequency domain resource area; and determining, by the terminal device, the eigenvectors of the downlink equivalent channels in the first frequency domain resource area based on the third covariance matrix, where the first frequency domain resource area includes a full bandwidth or a bandwidth part.

In a possible implementation of the first aspect, the vector information may be used to represent a channel status of a full-bandwidth downlink equivalent channel, or may be used to represent a channel status of a bandwidth part downlink equivalent channel. Because of high flexibility, this solution helps the network device fully learn a channel status of a downlink equivalent channel and further fully learn a channel status of a downlink channel, so that the network device can obtain a higher gain of spatial multiplexing.

Optionally, in a possible implementation of the first aspect, the performing, by the terminal device based on the dimension reduction matrix, dimension reduction on channel matrices corresponding to downlink reference signals received at a first moment, to determine eigenvectors of downlink equivalent channels includes: performing, by the terminal device based on the dimension reduction matrix, dimension reduction on the channel matrices corresponding to the downlink reference signals received at the first moment, to determine the eigenvectors of the downlink equivalent channels from a preset eigenvector set, where the vector information includes an index of the eigenvector in the preset eigenvector set.

The eigenvectors of the downlink equivalent channels are selected by the terminal device from the preset eigenvector set. The vector information includes the index. This solution helps reduce feedback overheads. Further, in this solution, complexity of determining the eigenvectors of the downlink equivalent channels by the terminal device can be reduced. This helps the terminal device feed back vector information.

In a possible implementation of the first aspect, the eigenvectors of the downlink equivalent channels include r eigenvectors, where r is configured by the network device or r is the same as a quantity of data flows supported by the terminal device, an eigenvalue corresponding to any one of the r eigenvectors is greater than or equal to an eigenvalue corresponding to any eigenvector other than the r eigenvectors in the eigenvectors of the downlink equivalent channels, and r≥1.

The terminal device does not need to feed back all the eigenvectors of the downlink equivalent channels to the network device. This can reduce feedback overheads, and enables the network device to obtain accurate CSI. Further, eigenvalues corresponding to the r eigenvectors are relatively large, so that the r eigenvectors can accurately represent channel statuses of the downlink equivalent channels.

In a possible implementation of the first aspect, a period in which the terminal device sends the matrix information is longer than a period in which the terminal device sends the vector information.

Based on different features of matrix information and the vector information, the two pieces of information are respectively fed back in a long period and a short period. This can reduce feedback overheads, and enables the network device to obtain accurate CSI.

Optionally, the period in which the terminal device sends the matrix information is 0.1-1 second, and/or the period in which the terminal device sends the vector information is 5-10 milliseconds.

According to a second aspect, a channel state information feedback method is provided. The method includes: receiving, by a network device, matrix information that is of a dimension reduction matrix and that is sent by a terminal device, where a first dimension of the dimension reduction matrix is the same as a quantity of transmit antenna ports of the network device, and a second dimension of the dimension reduction matrix is less than the first dimension of the dimension reduction matrix; receiving, by the network device, vector information that is of an eigenvector of a downlink equivalent channel and that is sent by the terminal device; and determining, by the terminal device, a precoding matrix based on the matrix information and the vector information, where the matrix information includes a matrix index of the dimension reduction matrix, or the matrix information includes information obtained by the terminal device by quantizing an element of the dimension reduction matrix; and the vector information includes an index of the eigenvector, or the vector information includes information obtained by the terminal device by quantizing an element of the eigenvector.

In the prior art, CSI is represented by using a precoding matrix determined from a codebook. In comparison, in the method in this embodiment of the present invention, CSI is jointly represented by using a dimension reduction matrix (matrix information) and an eigenvector (vector information), so that the network device can obtain accurate CSI. At least one of the matrix information and the vector information is not selected from a codebook according to a specific rule (if the information is selected from the codebook, there is no need to quantize an element). This helps the terminal device obtain a matching dimension reduction matrix and/or eigenvector based on an actual channel status of the downlink channel, so that the matrix information and the vector information may be used to accurately represent CSI.

In a possible implementation of the second aspect, at least one of the matrix information of the dimension reduction matrix and the vector information of the eigenvector is sent over an uplink data channel.

If the dimension reduction matrix is obtained by the terminal device through calculation based on an actual status of the downlink channel, the dimension reduction information occupies a relatively large quantity of bits, and can be better transmitted over an uplink data channel. Likewise, if the eigenvector is obtained by the terminal device through calculation based on an actual status of the downlink channel, the vector information occupies a relatively large quantity of bits, and can be better transmitted over an uplink data channel. A suitable transmission channel is selected based on actual statuses of the matrix information and the vector information, so that the network device can obtain the matrix information and the vector information.

In a possible implementation of the second aspect, a period in which the network device receives the matrix information is longer than a period in which the network device receives the vector information.

Based on different features of matrix information and the vector information, the network device respectively receives the dimension reduction information and the vector information in a long period and a short period. This can save transmission resources, and enables the network device to obtain accurate CSI.

According to a third aspect, a channel state information feedback method is provided. The method includes: receiving, by a terminal device, downlink reference signals sent by a network device based on a dimension reduction matrix, where a first dimension of the dimension reduction matrix is the same as a quantity of transmit antenna ports of the network device, and a second dimension of the dimension reduction matrix is less than the first dimension of the dimension reduction matrix; and sending, by the terminal device, vector information of eigenvectors of downlink equivalent channels to the network device based on channel matrices corresponding to the downlink reference signals.

The dimension reduction matrix is determined by the network device, and the dimension reduction matrix does not need to be periodically reported by the terminal device. This helps reduce CSI feedback overheads.

In a possible implementation of the third aspect, the method further includes: calculating, by the terminal device, the eigenvectors of the downlink equivalent channels based on the channel matrices corresponding to the downlink reference signals; and quantizing, by the terminal device, the eigenvectors to obtain the vector information.

The terminal device may obtain an eigenvector through calculation according to an actual channel status, and the eigenvector can accurately represent a channel status of a downlink equivalent channel. This helps improve CSI feedback accuracy. Further, in this solution, a good compromise can be made between CSI feedback accuracy and CSI feedback overheads.

In a possible implementation of the third aspect, the sending, by the terminal device, vector information of the eigenvectors to the network device includes: sending, by the terminal device, the vector information to the network device over an uplink data channel.

If the eigenvector is obtained by the terminal device through calculation based on an actual status of a downlink channel, the vector information occupies a relatively large quantity of bits, and can be better transmitted over an uplink data channel. A matching transmission channel is selected based on an actual status of the vector information. This helps the terminal device send the vector information to the network device.

In a possible implementation of the third aspect, the method further includes: calculating, by the terminal device, a covariance matrix of each of the channel matrices corresponding to the downlink reference signals; averaging, by the terminal device, covariance matrices corresponding to a first frequency domain resource area to obtain a third covariance matrix, where the covariance matrices corresponding to the first frequency domain resource area include the covariance matrices of the channel matrices corresponding to the downlink reference signals in the first frequency domain resource area, and the first frequency domain resource area includes a full bandwidth or a bandwidth part; and determining, by the terminal device, the eigenvectors of the downlink equivalent channels in the first frequency domain resource area based on the third covariance matrix The vector information may be used to represent a channel status of a full-bandwidth downlink equivalent channel, or may be used to represent a channel status of a bandwidth part downlink equivalent channel. Because of high flexibility, this solution helps the network device fully learn a channel status of a downlink equivalent channel and further fully learn a channel status of a downlink channel, so that the network device can obtain a higher gain of spatial multiplexing.

In a possible implementation of the third aspect, the eigenvectors of the downlink equivalent channels include r eigenvectors, where r is configured by the network device or r is the same as a quantity of data flows supported by the terminal device, an eigenvalue corresponding to any one of the r eigenvectors is greater than or equal to an eigenvalue corresponding to any eigenvector other than the r eigenvectors in the eigenvectors of the downlink equivalent channels, and r≥1.

According to a fourth aspect, a channel state information feedback method is provided. The method includes: sending, by a network device, a downlink reference signal based on a dimension reduction matrix, where a first dimension of the dimension reduction matrix is the same as a quantity of transmit antenna ports of the network device, and a second dimension of the dimension reduction matrix is less than the first dimension of the dimension reduction matrix; receiving, by the network device, vector information that is of an eigenvector of a downlink equivalent channel and that is sent by a terminal device based on the downlink reference signal; and determining, by the network device, a precoding matrix based on the dimension reduction matrix and the vector information.

In a possible implementation of the fourth aspect, the receiving, by the network device, vector information that is of an eigenvector of a downlink equivalent channel and that is sent by the terminal device based on the downlink reference signal includes: receiving, by the network device, the vector information over an uplink data channel.

In a possible implementation of the fourth aspect, the method further includes: determining, by the network device, the dimension reduction matrix based on channel matrices corresponding to uplink reference signals received in a first time period.

In a possible implementation of the fourth aspect, the determining, by the network device, the dimension reduction matrix based on channel matrices corresponding to uplink reference signals received in a first time period includes: calculating, by the network device, a first covariance matrix based on the channel matrices corresponding to the uplink reference signals received in the first time period, where the first covariance matrix is used to represent a statistical feature that is of the uplink channel and that is corresponding to the first time period; and calculating, by the network device, the dimension reduction matrix based on the first covariance matrix.

In a possible implementation of the fourth aspect, the calculating, by the network device, a first covariance matrix based on the channel matrices corresponding to the uplink reference signals received in the first time period includes: calculating, by the network device, a covariance matrix of each of the channel matrices corresponding to the uplink reference signals received by the network device in the first time period; averaging, by the network device, covariance matrices corresponding to uplink reference signals received at a same moment, to obtain a plurality of second covariance matrices, where the plurality of second covariance matrices are in a one-to-one correspondence with a plurality of moments included in the first time period; and performing, by the network device, averaging or time-domain filtering on the plurality of second covariance matrices to obtain the first covariance matrix.

In a possible implementation of the fourth aspect, a period in which the network device determines the dimension reduction matrix is longer than a period in which the network device receives the vector information.

According to a fifth aspect, a terminal device is provided, configured to perform the method according to the first aspect and any possible implementation of the first aspect. Specifically, the terminal device may include units that are configured to perform the method according to the first aspect and any possible implementation of the first aspect.

According to a sixth aspect, a network device is provided, configured to perform the method according to the second aspect and any possible implementation of the second aspect. Specifically, the network device may include units that are configured to perform the method according to the second aspect and any possible implementation of the second aspect.

According to a seventh aspect, a terminal device is provided, configured to perform the method according to the third aspect and any possible implementation of the third aspect. Specifically, the terminal device may include units that are configured to perform the method according to the third aspect and any possible implementation of the third aspect.

According to an eighth aspect, a network device is provided, configured to perform the method according to the fourth aspect and any possible implementation of the fourth aspect. Specifically, the network device may include units that are configured to perform the method according to the fourth aspect and any possible implementation of the fourth aspect.

According to a ninth aspect, a terminal device is provided, including a memory and a processor. The memory is configured to store a computer program, and the processor is configured to invoke the computer program from the memory and run the computer program, so that the terminal device performs the method according to the first aspect and any possible implementation of the first aspect.

According to a tenth aspect, a network device is provided, including a memory and a processor. The memory is configured to store a computer program, and the processor is configured to invoke the computer program from the memory and run the computer program, so that the network device performs the method according to the second aspect and any possible implementation of the second aspect.

According to an eleventh aspect, a terminal device is provided, including a memory and a processor. The memory is configured to store a computer program, and the processor is configured to invoke the computer program from the memory and run the computer program, so that the terminal device performs the method according to the third aspect and any possible implementation of the third aspect.

According to a twelfth aspect, a network device is provided, including a memory and a processor. The memory is configured to store a computer program, and the processor is configured to invoke the computer program from the memory and run the computer program, so that the network device performs the method according to the fourth aspect and any possible implementation of the fourth aspect.

According to a thirteenth aspect, a computer program product is provided. The computer program product includes computer program code. When the computer program code is executed by a processing unit and a transceiver unit, or a processor and a transceiver in the terminal device in the fifth aspect, the terminal device performs the method according to the first aspect and any possible implementation of the first aspect.

According to a fourteenth aspect, a computer program product is provided. The computer program product includes computer program code. When the computer program code is executed by a processing unit and a transceiver unit, or a processor and a transceiver in the network device in the sixth aspect, the network device performs the method according to the second aspect and any possible implementation of the second aspect.

According to a fifteenth aspect, a computer program product is provided. The computer program product includes computer program code. When the computer program code is executed by a processing unit and a transceiver unit, or a processor and a transceiver in the terminal device in the seventh aspect, the terminal device performs the method according to the third aspect and any possible implementation of the third aspect.

According to a sixteenth aspect, a computer program product is provided. The computer program product includes computer program code. When the computer program code is executed by a processing unit and a transceiver unit, or a processor and a transceiver in the network device in the eighth aspect, the network device performs the method according to the fourth aspect and any possible implementation of the fourth aspect.

According to a seventeenth aspect, a computer-readable storage medium is provided, configured to store a computer program. The computer program includes an instruction used to perform the method according to the first aspect and any possible implementation of the first aspect.

According to an eighteenth aspect, a computer-readable storage medium is provided, configured to store a computer program. The computer program includes an instruction used to perform the method according to the second aspect and any possible implementation of the second aspect.

According to a nineteenth aspect, a computer-readable storage medium is provided, configured to store a computer program. The computer program includes an instruction used to perform the method according to the third aspect and any possible implementation of the third aspect.

According to a twentieth aspect, a computer-readable storage medium is provided, configured to store a computer program. The computer program includes an instruction used to perform the method according to the fourth aspect and any possible implementation of the fourth aspect.

According to the method, the terminal device, and the network device in the embodiments of the present invention, CSI is jointly represented by using a dimension reduction matrix and an eigenvector, so that the network device can obtain accurate CSI.

DESCRIPTION OF EMBODIMENTS

The following clearly describes the technical solutions in the embodiments of the present invention with reference to the accompanying drawings in the embodiments of the present invention.

MIMO may be classified into single-user multiple-input multiple-output (SU-MIMO) and multi-user multiple-input multiple-output (MU-MIMO). In Massive MIMO, based on a principle of multi-user beamforming, hundreds of antennas are disposed on a transmit end device to modulate respective beams of dozens of target receivers, so as to simultaneously transmit dozens of signals on a same frequency resource by isolating spatial signals. Therefore, in the Massive MIMO technology, a spatial degree of freedom brought by configuring massive antennas can be fully used to improve spectral efficiency.

Figure 1:
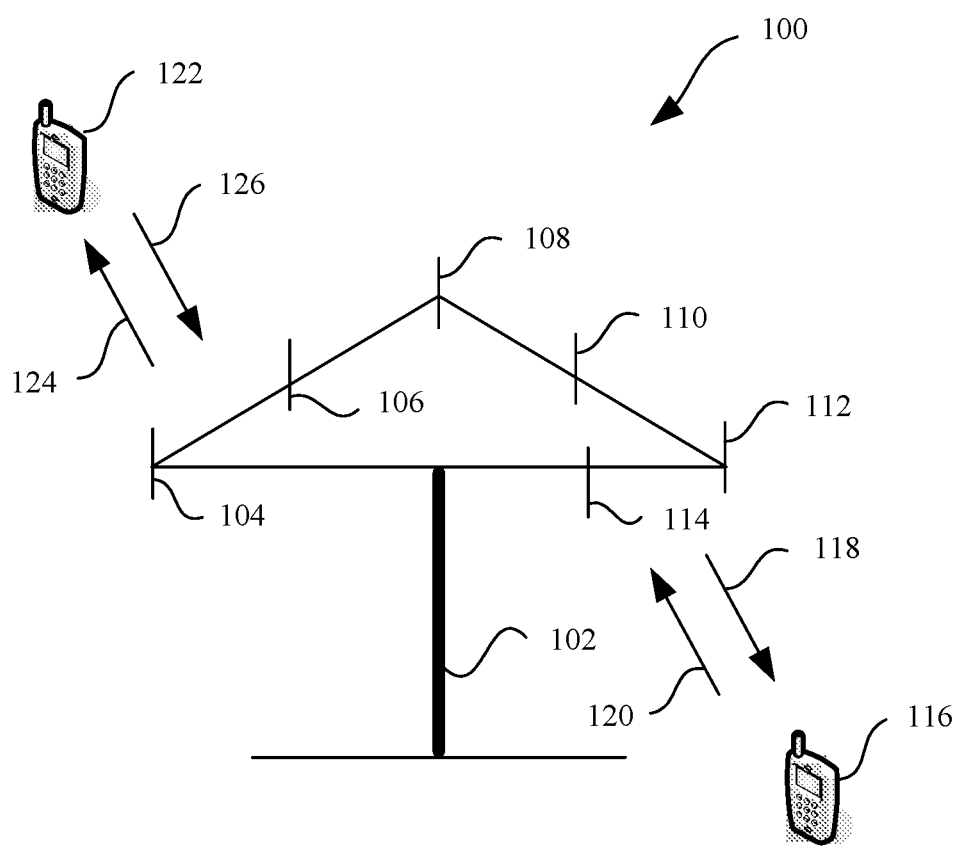
FIG. 1 is a schematic diagram of a communications system applicable to an embodiment of the present invention.

FIG. 1 is a schematic diagram of a communications system applicable to an embodiment of the present invention. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that the transmitter chain and the receiver chain may each include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices similar to the terminal device 116 or 122. Each of the terminal devices 116 and 122 may be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 through a forward link 118, and receive information from the terminal device 116 through a reverse link 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system and a full duplex (Full Duplex) system, the forward link 118 and the reverse link 120 may use a same frequency band, and the forward link 124 and the reverse link 126 may use a same frequency band.

The network device 102 sends a downlink signal by using a precoding technology. A basic idea of the precoding technology is that the network device designs a downlink signal sending manner by analyzing CSI, so that the network device can use an eigenstructure of a channel matrix to send the downlink signal, to minimize interference between independent data flows. When the network device learns accurate CSI, the network device may obtain a maximum gain when sending a downlink signal.

Because there is reciprocity between an uplink channel and a downlink channel in a TDD system with channel calibration, the network device may estimate relatively accurate CSI by using a sounding reference signal (SRS), so that the network device may obtain relatively accurate CSI. However, in an FDD system and an uncalibrated TDD system, CSI can be fed back to the network device by the terminal device only over an uplink channel. The terminal device directly feeds back a channel matrix of a downlink channel. Although the network device may obtain most accurate CSI, overheads are excessively high in this manner, and consequently, this manner cannot be applied to an actual communications system.

To reduce CSI feedback overheads, the terminal device quantizes CSI by using a codebook matrix in a codebook, where the codebook is known to the terminal device and the network device. The terminal device determines that a codebook matrix that most matches CSI is a precoding matrix, and feeds back an index of the precoding matrix to the network device. The codebook is preconfigured, and the terminal device may select the most matching precoding matrix from the codebook based on a channel estimation result. However, the most matching precoding matrix is still relatively greatly different from an actual channel status, that is, the precoding matrix cannot accurately represent CSI. Although the feedback overheads can be reduced in this manner, accuracy of the CSI fed back by the terminal device is limited in this manner.

In view of this, the embodiments of the present invention provide a channel state information feedback method. A channel based on Massive MIMO has spatial sparsity, and a good compromise is made between feedback overheads of CSI and feedback accuracy of the CSI by using a compression dimension reduction manner. The following describes in detail the channel state information feedback method according to the embodiments of the present invention.

It should be understood that the technical solutions in the embodiments of the present invention may be applied to various communications systems, such as: a global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, a universal mobile telecommunications system (UMTS), or a next-generation communications system (for example, 5G).

In the embodiments of the present invention, a network device may be a device configured to communicate with a mobile device. The network device may be an access point (AP) in a WLAN or a base transceiver station (BTS) in GSM or CDMA, or may be a NodeB (NB) in WCDMA, or may be an evolved NodeB (eNB or eNodeB) in LTE, a relay node, an access point, an in-vehicle device, a wearable device, a network device in a future 5G network, or a network device in a future evolved public land mobile network (PLMN).

A terminal device in the embodiments of the present invention may also be referred to as user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), a cellular phone, a cordless phone, a Session Initiation Protocol (SIP) phone, a wireless local loop (WLL) station, a personal digital assistant (PDA) device, a handheld device having a wireless communication function, a computing device, another processing device connected to a wireless modem, an in-vehicle device, a wearable device, a terminal device in a next-generation communications system, for example, a terminal device in a 5G network, or a terminal device in a future evolved PLMN.

It should be noted that division of cases, manners, or the like in the embodiments of the present invention is merely for convenience of description, and should not constitute a special limitation. Features in various cases and manners may be combined if the features in the various cases and manners do not conflict with each other.

It should be further noted that, in the embodiment of the present invention, "first", "second", and the like are merely intended to distinguish, and should not constitute any limitation on the embodiments of the present invention.

Figure 2:
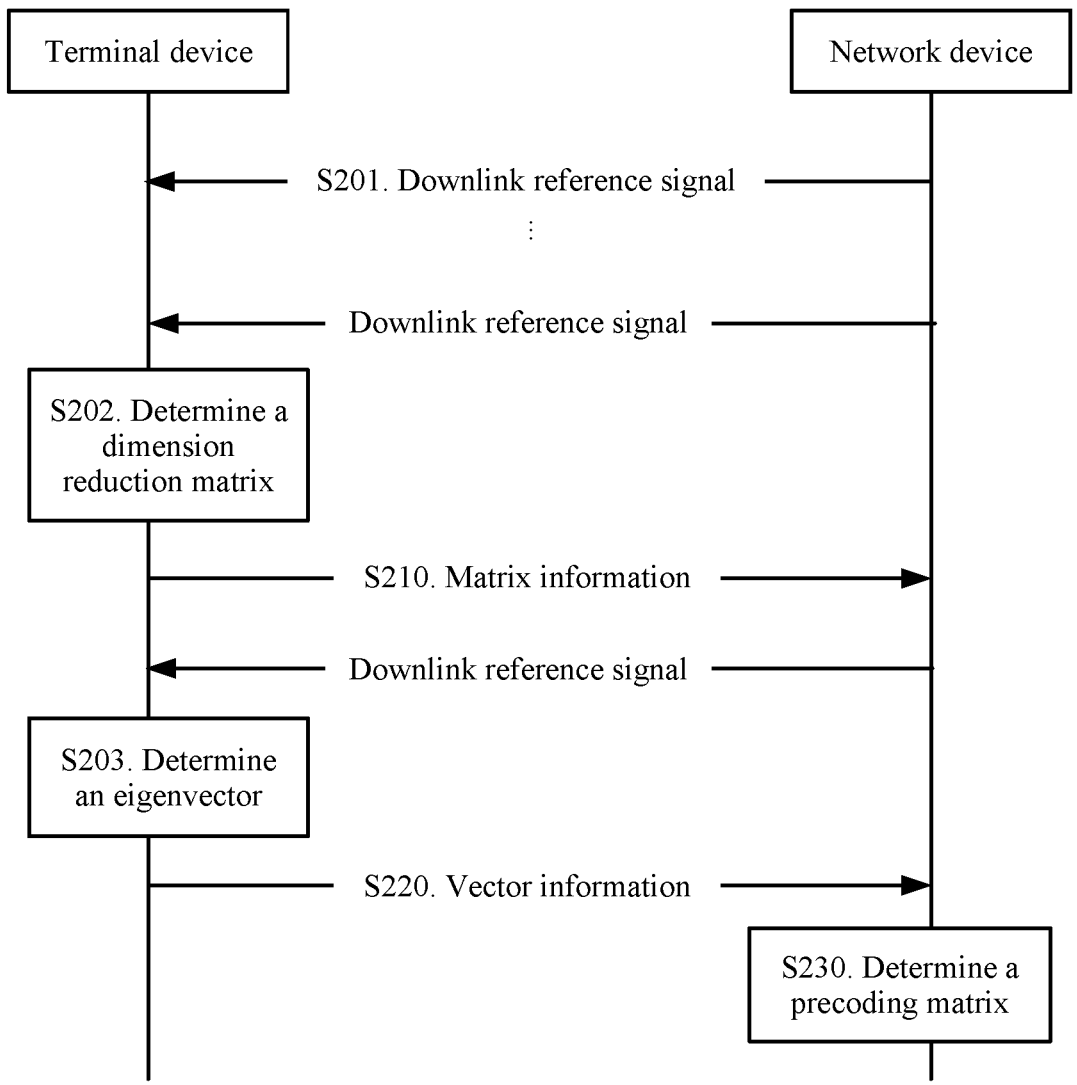
FIG. 2 is a schematic flowchart of an example of a channel state information feedback method according to an embodiment of the present invention.
Figure 3:
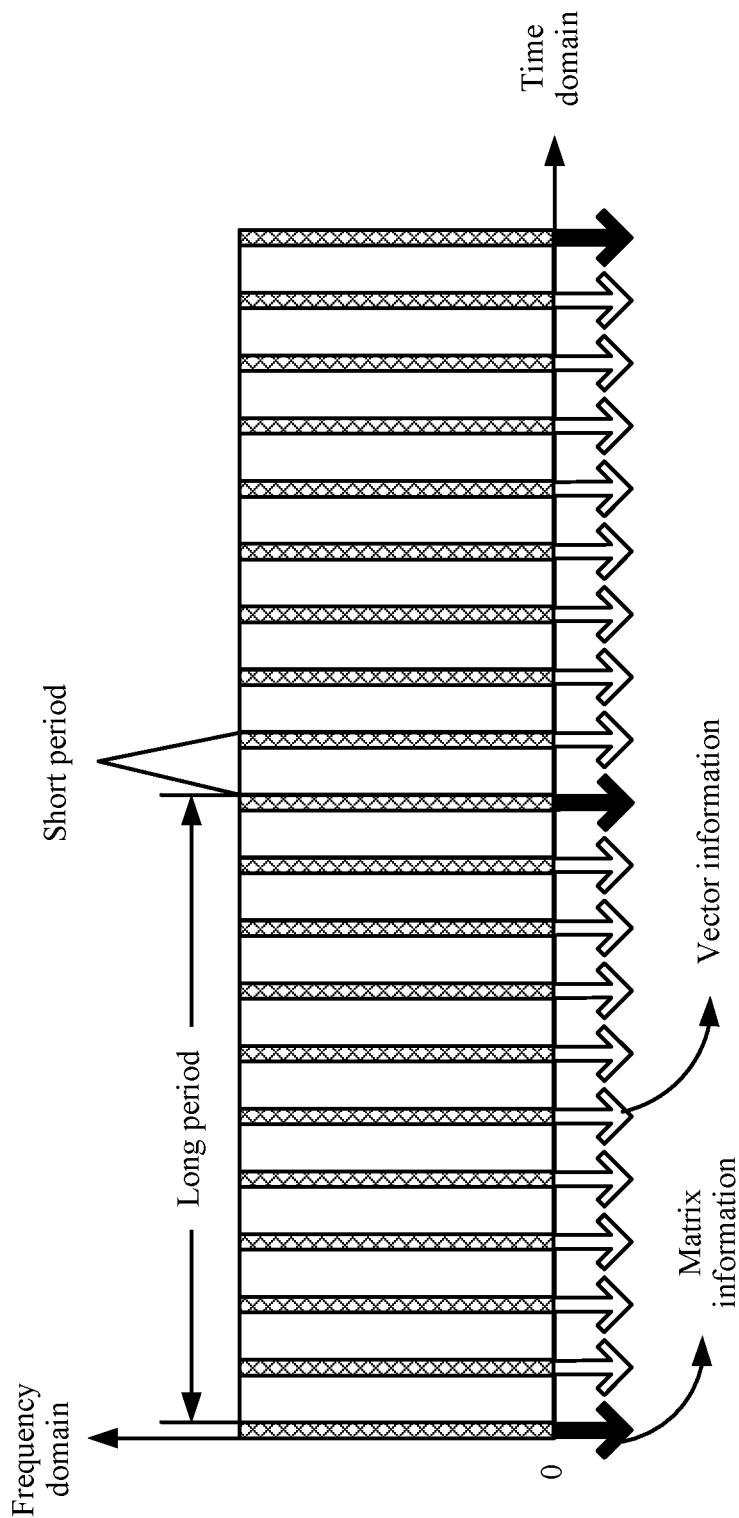
FIG. 3 is a schematic flowchart of another example of a channel state information feedback method according to an embodiment of the present invention.
Figure 4:
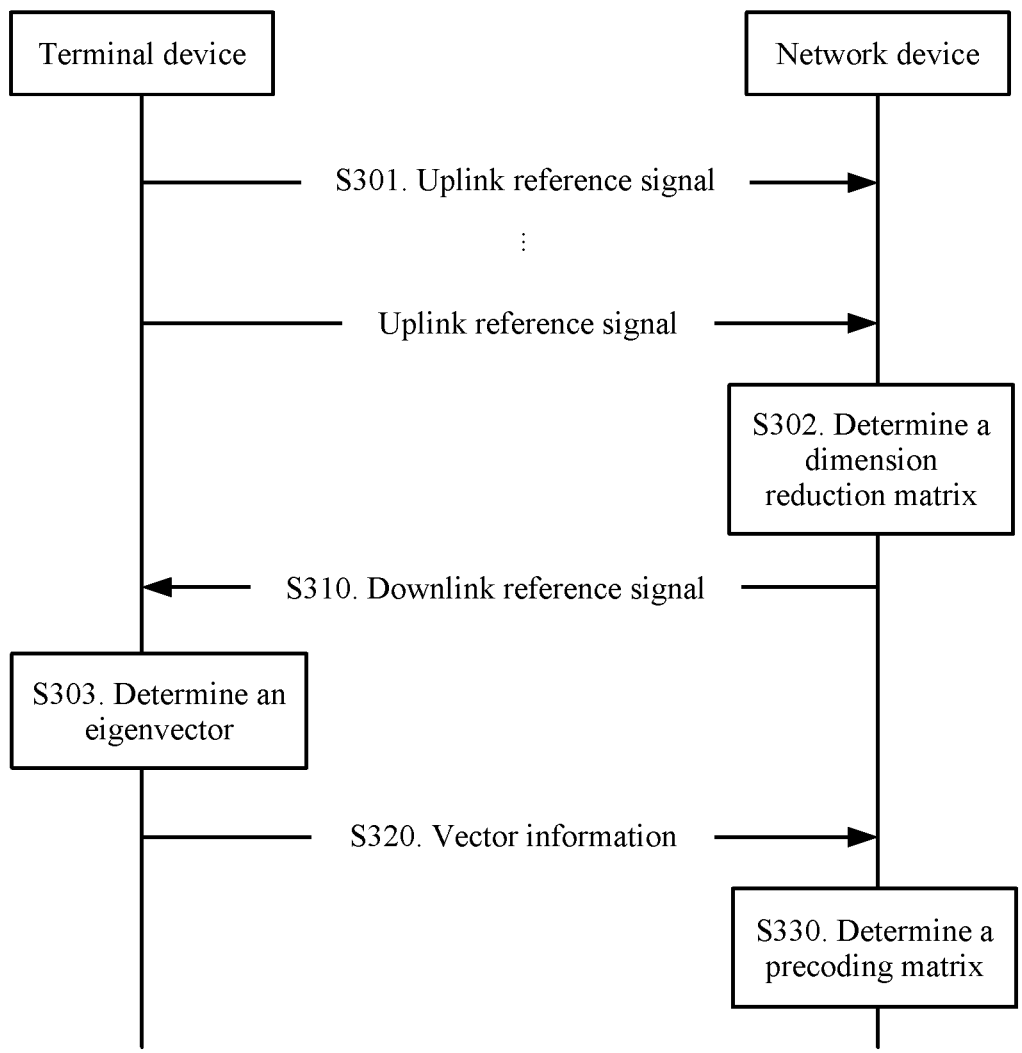
FIG. 4 is a schematic flowchart of still another example of a channel state information feedback method according to an embodiment of the present invention.

The following describes in detail a channel state information feedback method according to the embodiments of the present invention with reference to FIG. 2 to FIG. 4.

It should be understood that FIG. 2 and FIG. 4 are schematic flowcharts of feeding back channel state information method according to the embodiments of the present invention. It should be understood that FIG. 2 and FIG. 4 show detailed communication steps or operations of the method, but these steps or operations are merely examples. In the embodiments of the present invention, another operation or a variant of each operation in FIG. 2 and FIG. 4 may alternatively be performed. In addition, all the steps in FIG. 2 and FIG. 4 may be separately performed in a sequence different from that presented in FIG. 2 and FIG. 4, and it is possible that only some operations in FIG. 2 and FIG. 4 are performed.

FIG. 2 is a schematic flowchart of an example of a channel state information feedback method according to an embodiment of the present invention. Specifically, FIG. 2 is a schematic flowchart of the channel state information feedback method 200, described from a perspective of device interaction, according to an embodiment of the present invention. As shown in FIG. 2, the method 200 may include the following step:

S210. A terminal device sends matrix information of a dimension reduction matrix to a network device; and correspondingly, the network device receives the matrix information of the dimension reduction matrix sent by the terminal device.

A first dimension of the dimension reduction matrix is the same as a quantity of transmit antenna ports of the network device, and a second dimension of the dimension reduction matrix is less than the first dimension of the dimension reduction matrix.

Specifically, the dimension reduction matrix is used to perform dimension reduction on a channel matrix. For example, the terminal device may perform, based on the dimension reduction matrix, dimension reduction on channel matrices corresponding to downlink reference signals received at a first moment.

The following describes the dimension reduction matrix by using an example in which a first dimension is a row dimension and a second dimension is a column dimension.

It should be understood that the terminal device may perform channel estimation on the received downlink reference signals to obtain a channel estimation result, where the channel estimation result includes a channel matrix.

The method 200 may further include the following step:

S201. The network device sends a downlink reference signal to the terminal device; and correspondingly, the terminal device receives the downlink reference signal sent by the network device.

Specifically, the terminal device may determine the dimension reduction matrix of a downlink channel based on channel matrices corresponding to downlink reference signals received (by the terminal device) in a first time period. Further, the dimension reduction matrix may be used to perform dimension reduction on the channel matrices corresponding to the downlink reference signals received at a first moment of a second time period. The second time period is later than the first time period, and the first moment may include an end moment of the first time period.

It should be understood that the network device may periodically send a downlink reference signal; and correspondingly, the terminal device may periodically receive the downlink reference signal sent by the network device. The terminal device may obtain, based on the downlink reference signals received within the first time period, the channel matrices corresponding to the downlink reference signals received in the first time period.

For example, it is assumed that the first time period is 0.1 second, and a period in which the terminal device receives a downlink reference signal is 10 milliseconds; in other words, the terminal device receives a downlink reference signal every 10 milliseconds. The terminal device may obtain, based on the downlink reference signals received ten times within the 0.1 second, the channel matrices corresponding to the downlink reference signals received in the first time period.

A downlink reference signal received each time by the terminal device in the first time period occupies at least one resource block (RB), and the at least one RB is in one-to-one correspondence with at least one channel matrix. Because the terminal device may receive a downlink reference signal a plurality of times within the first time period, the channel matrices corresponding to the downlink reference signals received in the first time period include a plurality of channel matrices. For ease of description, "the channel matrices corresponding to the downlink reference signals received in the first time period" may be denoted as a "channel matrix set".

That the first time period is 0.1 second and a receiving period of the downlink reference signal is 10 milliseconds is still used as an example. It is assumed that each time the terminal device receives a downlink reference signal, M channel matrices may be obtained, and the channel matrix set includes 10×M channel matrices.

It should be noted that each of at least one downlink reference signal received by the terminal device at a same moment (that is, in one period) is corresponding to one antenna port; and each antenna port may be corresponding to one physical antenna, or may be corresponding to one virtual antenna, where the virtual antenna may be a weighted combination of a plurality of physical antennas. The terminal device may obtain, based on a downlink reference signal corresponding to an antenna port, an estimation result of channels between the terminal device and the antenna port, that is, a channel matrix.

Optionally, a quantity of antenna ports on which the network device sends downlink reference signals is the same as a quantity of transmit antenna ports of the network device. In other words, all transmit antenna ports of the network device are used to send the downlink reference signals. Then a non-precoded (non-precoded) CSI-RS may be used, so that the terminal device can estimate complete channel state information.

It should be noted that a CSI-RS is used by a terminal to measure channel state information, and is especially used in a case of multi-antenna transmission. As an example of a reference signal, the CSI-RS is merely an example for illustration, and should not constitute any limitation on this embodiment of the present invention. Another reference signal may alternatively be used to measure the channel state in this embodiment of the present invention.

The method 200 may further include the following step:

S202. The terminal device determines the dimension reduction matrix based on channel matrices corresponding to downlink reference signals received in a first time period.

Specifically, the terminal device may obtain the channel matrix set based on the downlink reference signals received within the first time period. A dimension of each channel matrix H in the channel matrix set is $N_R \times N_T$, where $N_R$ represents a quantity of transmit antenna ports of the terminal device, and $N_T$ represents a quantity of receive antenna ports of the network device. The terminal device may determine, based on the channel matrix set, a dimension reduction matrix P used to perform dimension reduction on a channel matrix, where a dimension of the dimension reduction matrix P is $N_T \times N_P$, and $N_P < N_T$.

A dimension reduction matrix is used to perform dimension reduction on a channel matrix. A low-dimension equivalent matrix $\overline{H}$ may be obtained after dimension reduction is performed on a high-dimension channel matrix H by using a dimension reduction matrix. Specifically, an equivalent matrix $\overline{H}_1 \in C^{N_R \times N_P}$ may be obtained after dimension reduction is performed on a channel matrix $H_1 \in C^{N_R \times N_T}$ by using a dimension reduction matrix $P \in C^{N_T \times N_P}$.

Further, a loss caused when a low-dimension equivalent matrix is obtained after dimension reduction is performed on a high-dimension channel matrix is related to a dimension reduction matrix. In order that the low-dimension equivalent matrix is obtained after dimension reduction is performed on the high-dimension channel matrix at a low loss, optionally, energy of a subspace corresponding to the dimension reduction matrix in the first time period is highest among energy of a plurality of subspaces corresponding to the downlink channel in a same dimension, and orthogonality is met between column vectors of the dimension reduction matrix.

For ease of description, the "subspace corresponding to the dimension reduction matrix" is denoted as a "first subspace".

The energy of the first subspace is highest among the energy of the plurality of subspaces corresponding to the downlink channel in the same dimension. It may be understood that energy of the downlink channel is mainly concentrated in the first subspace in the first time period. Specifically, the channel matrix set may be considered as a space, the energy of the downlink channel is not evenly distributed in the space, the energy of the downlink channel in the first time period is mainly concentrated in the first subspace, and the first subspace may be an eigensub space of the space.

The low-dimension equivalent matrix may be obtained by projecting a high-dimension channel matrix into the first subspace (that is, multiplied by the dimension reduction matrix corresponding to the first subspace). It may be considered that the low-dimension channel matrix is a concentrated representation of the high-dimension channel matrix.

Optionally, in this embodiment of the present invention, the terminal device may determine the dimension reduction matrix in at least the following manners:

Manner 1

The terminal device calculates the dimension reduction matrix.

In an optional example, the terminal device may calculate the dimension reduction matrix by calculating a first covariance matrix $R \in C^{N_T \times N_T}$.

The first covariance matrix is used to represent (or indicate) a statistical feature that is of the downlink channel and that is corresponding to the first time period. The terminal device may calculate the first covariance matrix in a plurality of manners.

For example, the terminal device may calculate a covariance matrix of each channel matrix in the channel matrix set to obtain a covariance matrix set. Covariance matrices included in the covariance matrix set are in a one-to-one correspondence with the channel matrices included in the channel matrix set. The terminal device may divide the covariance matrices in the covariance matrix set into a plurality of groups based on moments. The plurality of groups of covariance matrices are in a one-to-one correspondence with a plurality of moments. The terminal device may average each group of covariance matrices to obtain a second covariance matrix at a corresponding moment, and the terminal device performs averaging or time-domain filtering on second covariance matrices at the plurality of moments to obtain the first covariance matrix. The second covariance matrix is used to represent a statistical feature, of the downlink channel, at a corresponding moment.

For example, it is assumed that the first time period is 0.1 second, and a receiving period of a downlink reference signal is 10 milliseconds (that is, the terminal device receives a downlink reference signal 10 times in the first time period, or receives a downlink reference signal at 10 moments of the first time period). The terminal device may obtain M channel matrices H each time the terminal device receives a downlink reference signal, where the channel matrix set includes 10×M channel matrices H, and the terminal device calculates covariance matrices $H^H H$ of each of 10×M channel matrices H to obtain 10×M covariance matrices $H^H H$. The terminal device may average M covariance matrices at each moment to obtain a second covariance matrix at the moment, and the terminal device performs averaging or time-domain filtering on 10 second covariance matrices to obtain the first covariance matrix.

The terminal device may obtain the dimension reduction matrix based on the first covariance matrix by using an eigenvalue decomposition method, a singular value decomposition (SVD) method, a power method, or another algorithm. Optionally, the first subspace corresponding to the dimension reduction matrix may be an eigensubspace of the first covariance matrix.

In another optional example, the terminal device may determine the dimension reduction matrix based on the channel matrix set by using a PAST algorithm, a Lanczos algorithm, and another algorithm.

The dimension reduction matrix in Manner 1 is obtained by the terminal device through adaptive calculation based on an estimation result of the downlink channel, and dimension reduction is performed on a channel matrix of the downlink channel based on the dimension reduction matrix obtained through calculation, so that a dimension reduction loss of the channel matrix of the downlink channel can be reduced.

Optionally, if the terminal device calculates the dimension reduction matrix, the method 200 may further include: obtaining, by the terminal device, the matrix information by quantizing elements of the dimension reduction matrix. Optionally, the terminal device sends the matrix information over an uplink data channel.

The terminal device may quantize the elements of the dimension reduction matrix in a plurality of manners. For example, the terminal device may separately quantize an amplitude and a phase in each column of the dimension reduction matrix. Both the amplitude and the phase may be considered as unsigned numbers, thereby eliminating overheads of quantizing sign bits, and reducing feedback overheads. For another example, the terminal device may separately quantize a real part and an imaginary part in each column of the dimension reduction matrix. A quantization procedure is described subsequently.

Manner 2

The terminal device determines the dimension reduction matrix from a preset dimension reduction matrix set.

Specifically, a dimension reduction matrix set may be preset. Both the terminal device and the network device know the dimension reduction matrix set, and the dimension reduction matrix set includes a plurality of dimension reduction matrices. The terminal device may select the dimension reduction matrix of the downlink channel from the dimension reduction matrix set based on the channel matrix set.

The terminal device may select the dimension reduction matrix based on a plurality of criteria. For example, the terminal device may calculate, based on the channel matrix set, energy of a downlink channel corresponding to each dimension reduction matrix in the dimension reduction matrix set, and select a dimension reduction matrix having the downlink channel with highest energy as the dimension reduction matrix of the downlink channel. In other words, it may be considered that the energy of the downlink channel in the first time period is mainly concentrated in the first subspace corresponding to the dimension reduction matrix.

The dimension reduction matrix is selected by the terminal device from the preset dimension reduction matrix set, so that feedback overheads of feeding back the dimension reduction matrix by the terminal device may be reduced. Further, complexity of calculating the dimension reduction matrix by the terminal device may be further reduced.

If the dimension reduction matrix is selected by the terminal device from the preset dimension reduction matrix, the matrix information includes an index of the dimension reduction matrix in the preset dimension reduction matrix set.

Optionally, the dimension reduction matrix is corresponding to a plurality of orthogonal beams with a same beam directivity pattern. In other words, all columns of the dimension reduction matrix are corresponding to a same beam directivity pattern.

All the columns of the dimension reduction matrix are corresponding to the same beam directivity pattern, and energy for receiving a channel on one beam is similar to energy for receiving a channel on another beam, so that feedback overheads are reduced when information about a downlink equivalent channel is subsequently transmitted.

Optionally, the dimension reduction matrix set in this embodiment of the present invention may be generated by using a structure of a Kronecker product and/or by dividing a massive antenna array into subarrays. However, the generation manner is not limited.

S220. The terminal device sends vector information of an eigenvector of a downlink equivalent channel to the network device; and correspondingly, the network device receives the vector information sent by the terminal device.

The eigenvector of the downlink equivalent channel is obtained based on the dimension reduction matrix. The downlink equivalent channel may be understood as a channel obtained by projecting the downlink channel into the first subspace (or a channel obtained after dimension reduction is performed on the downlink channel by using the dimension reduction matrix). The downlink equivalent channel may be considered as a concentrated representation of the downlink channel, and a channel status of the downlink equivalent channel and the dimension reduction matrix may be used to represent a channel status of the downlink channel. The eigenvector of the downlink equivalent channel may be used to represent a channel status of the downlink equivalent channel (for example, eigenvectors of downlink equivalent channels at a first moment are used to represent channel statuses of the downlink equivalent channels at the first moment). The eigenvectors of the downlink equivalent channels may include r eigenvectors, and then the eigenvectors of the downlink equivalent channels may be denoted as $V \in C^{N_p \times r}$, where r is configured by the network device or r is the same as a quantity (namely, a rank) of data flows supported by the terminal device, and $r \geq 1$.

Optionally, an eigenvalue corresponding to any one of the r eigenvectors is greater than or equal to an eigenvalue corresponding to any eigenvector other than the r eigenvectors in a plurality of eigenvectors of the downlink equivalent channels.

Optionally, the eigenvectors of the downlink equivalent channel may include at least one of the following two types:

1. a full-bandwidth eigenvector of a downlink equivalent channel, where the full-bandwidth eigenvector is used to represent a channel status of the full-bandwidth downlink equivalent channel; and 2. a bandwidth part eigenvector of a downlink equivalent channel, where the bandwidth part eigenvector is used to represent a channel status of the bandwidth part downlink equivalent channel.

That is, the terminal device may feed back a full-bandwidth eigenvector or a bandwidth part eigenvector of a current downlink equivalent channel to the network device based on a feedback granularity, where the feedback granularity may include a full bandwidth or a bandwidth part (for example, a bandwidth of a subband).

For example, a feedback granularity is a bandwidth part. It is assumed that a full bandwidth is 20 M and the feedback granularity is 10 M. The terminal device may determine a first bandwidth part eigenvector corresponding to 0 M to 10 M and/or a second bandwidth part eigenvector corresponding to 10 M to 20 M, and feed back corresponding vector information.

The method 200 may further include the following step:

S203. The terminal device performs, based on the dimension reduction matrix, dimension reduction on channel matrices corresponding to downlink reference signals received at a first moment, to determine eigenvectors of downlink equivalent channels corresponding to the downlink reference signals received at the first moment.

The first moment is later than the first time period, and the first moment may include the end moment of the first time period. It should be understood that the channel statuses of the downlink equivalent channels corresponding to the downlink reference signals received at the first moment are used to represent channel statuses of the downlink channels corresponding to the downlink reference signals received at the first moment, and the eigenvectors of the downlink equivalent channels corresponding to the downlink reference signals received at the first moment are used to represent the channel statuses of the downlink equivalent channels corresponding to the downlink reference signals received at the first moment. Optionally, the terminal device may determine an eigenvector of a downlink equivalent channel in at least the following several manners.

Manner 1

The terminal device calculates the eigenvector of the downlink equivalent channel.

Specifically, the terminal device may multiply channel matrices corresponding to current downlink reference signals by a dimension reduction matrix to obtain equivalent matrices corresponding to the current downlink reference signals, that is, $\overline{H}=HP$.

It may be learned from the foregoing description that a channel matrix corresponding to a downlink reference signal received each time by the terminal device includes at least one channel matrix. The terminal device may perform dimension reduction on the at least one channel matrix to obtain at least one equivalent matrix that is in a one-to-one correspondence with the at least one channel matrix. For example, it is assumed that the terminal device performs channel estimation on currently received downlink reference signals to obtain M channel matrices, and the terminal device may perform dimension reduction on the M channel matrices to obtain M equivalent matrices. For ease of description, the "equivalent matrices corresponding to the current downlink reference signals" may be denoted as an "equivalent matrix group".

The terminal device may obtain eigenvectors of downlink equivalent channels in a first frequency domain resource area by calculating a third covariance matrix corresponding to the first frequency domain resource area based on the equivalent matrix group. The third covariance matrix is used to represent a statistical feature of the downlink equivalent channels in the first frequency domain resource area. The first frequency domain resource area includes a full bandwidth or a partial bandwidth.

Further, the terminal device may average covariance matrices corresponding to the first frequency domain resource area to obtain the third covariance matrix of the first frequency domain resource area.

It should be understood that the covariance matrices corresponding to the first frequency domain resource area include covariance matrices of equivalent matrices corresponding to the downlink reference signals received at the first moment in the first frequency domain resource area.

Specifically, if a feedback granularity is a full bandwidth (that is, the first frequency domain resource is full-bandwidth), the terminal device may calculate a covariance matrix of each equivalent matrix in the equivalent matrix group, and average all the covariance matrices to obtain the third covariance matrix of the full-bandwidth downlink equivalent channels, where the third covariance matrix is used to represent a statistical feature of the full-bandwidth downlink equivalent channels. The terminal device may obtain an eigenvector of the third covariance matrix by using a plurality of algorithms. For details, refer to the foregoing related description. For brevity, the details are not described herein again.

For example, it is assumed that a full bandwidth is 20 M (including 100 RBs), and the terminal device obtains 100 equivalent matrices, and further obtains 100 covariance matrices that are in a one-to-one correspondence with the 100 equivalent matrices. The terminal device may average the 100 covariance matrices to obtain a third covariance matrix, and the terminal device may calculate an eigenvector (that is, a full-bandwidth eigenvector) of the third covariance matrix. Information about the eigenvectors may be used to represent the channel statuses of the full-bandwidth downlink equivalent channels.

Specifically, if a feedback granularity is a bandwidth part, the terminal device may calculate a covariance matrix of each equivalent matrix in the equivalent matrix group, and average, in units of bandwidth parts, covariance matrices corresponding to bandwidth parts to obtain a third covariance matrix corresponding to each bandwidth part, where each third covariance matrix is used to represent a channel status of a downlink equivalent channel of a corresponding bandwidth part.

For example, it is assumed that a full bandwidth is 20 M (including 100 RBs), and the feedback granularity is 10 M (including 50 RBs). The terminal device obtains 100 covariance matrices, where 50 of the 100 covariance matrices are corresponding to bandwidths of 0 M to 10 M, and the other 50 covariance matrices are corresponding to bandwidths of 10-20 M. The terminal device may average the 50 covariance matrices corresponding to the bandwidths of 0-10 M to obtain a third covariance matrix corresponding to the bandwidths of 0-10 M, and calculate an eigenvector (that is, a first bandwidth part eigenvector) of the third covariance matrix. Likewise, the terminal device may average the 50 covariance matrices corresponding to the bandwidths of 10-20 M to obtain a third covariance matrix corresponding to the bandwidths of 10-20 M, and calculate an eigenvector (that is, a second bandwidth part eigenvector) of the third covariance matrix. In this case, information about the vectors may include the first bandwidth part eigenvector and/or the second bandwidth part eigenvector.

In another optional example, the terminal device may determine the eigenvector of the downlink equivalent channel based on the channel matrix set by using a PAST algorithm, a Lanczos algorithm, and another algorithm.

In Manner 1, the eigenvector is calculated by the terminal device based on the equivalent matrix, so that the eigenvector may better represent a channel status of a downlink equivalent channel at the first moment.

Optionally, if the terminal device calculates the eigenvector, the method 200 may further include: obtaining, by the terminal device, the vector information by quantizing elements of the eigenvector. Optionally, the terminal device sends the vector information over a data channel.

Manner 2

The terminal device determines the eigenvector of the downlink equivalent channel from a preset eigenvector set.

Specifically, an eigenvector set may be preset. Both the terminal device and the network device know the eigenvector set. The terminal device may perform dimension reduction on a channel matrix corresponding to a currently received downlink reference signal based on a dimension reduction matrix, and determine the eigenvector of the downlink equivalent channel from the eigenvector set according to a specific criterion.

The eigenvector is selected by the terminal device from the preset eigenvector set, and information about the vector includes an index of the eigenvector in the vector set. In this manner, feedback overheads of feeding back vectors by the terminal device can be reduced.

It should be noted that if a plurality of eigenvectors are corresponding to a downlink channel, for example, r=2, there may be at least the following two cases of the eigenvector set:

(1) The eigenvector set includes a plurality of eigenvectors, and the terminal device may select two eigenvectors from the plurality of eigenvectors, and feed back two indexes corresponding to the two eigenvectors.

(2) The eigenvector set includes a plurality of eigenmatrices, each of the plurality of eigenmatrices includes two columns (each column of the eigenmatrix may be considered as one eigenvector), and the terminal device may select one eigenmatrix from the plurality of eigenmatrices, and feed back an index of the eigenmatrix.

As described above, the terminal device may determine and feed back the matrix information and the vector information. The following describes in detail how the terminal device feeds back the matrix information and the vector information.

Optionally, in this embodiment of the present invention, the terminal device may periodically determine the dimension reduction matrix and the eigenvector. That the terminal device periodically determines the dimension reduction matrix and the eigenvector may be understood as that the terminal device periodically feeds back matrix information and vector information. Correspondingly, the network device periodically receives and updates the matrix information, and obtains the channel state information at a corresponding moment by using the updated matrix information.

For example, duration corresponding to the first time period may be a period in which the terminal device feeds back matrix information. The terminal device may perform dimension reduction on a channel matrix of the second time period based on the dimension reduction matrix determined by using the downlink reference signals received in the first time period. Duration of the second time period is equal to the duration of the first time period, and the second time period is a next time period of the first time period. In other words, the terminal device may perform, based on a dimension reduction matrix determined by using downlink reference signals received in an $i^{th}$ time period, dimension reduction on channel matrices received in an $(i+1)^{th}$ time period. Correspondingly, the network device recovers, based on dimension reduction information received at an end moment of the $i^{th}$ time period, vector information received at the $(i+1)^{th}$ time period to obtain a high-dimension matrix, where i is a positive integer greater than 0.

Optionally, the period in which the terminal device feeds back the matrix information is longer than a period in which the terminal device feeds back the vector information. That is, the terminal device may respectively feed back the matrix information and the vector information in a long period and a short period.

Short period: The terminal device may perform dimension reduction processing on a high-dimension channel matrix with spatial sparsity to obtain a low-dimension equivalent matrix. The low-dimension equivalent matrix is a concentrated representation of the high-dimension channel matrix, and the terminal device may feed back information about an equivalent matrix of a downlink channel in a relatively short period, that is, vector information, so that the network device instantly learns a channel status and performs corresponding processing. For example, a feedback period of the vector information may be 5 milliseconds or 10 milliseconds.

Optionally, a period in which the terminal device feeds back the vector information is longer than or equal to a period in which the terminal device receives the downlink reference signal (or the network device sends the downlink reference signal). If the period of feeding back the vector information is the same as the period of receiving the downlink reference signal, the network device may obtain a channel status of a downlink reference signal sent each time. This helps the network device perform corresponding processing.

Long period: The terminal device further needs to send the matrix information to the network device, so that the network device can obtain a high-dimension channel matrix based on the vector information. Different from real-time feedback of the vector information, the dimension reduction matrix is statistical information obtained on the basis of continuous estimation performed by the terminal device on a channel status, and does not need to be fed back in real time. A feedback period may be appropriately prolonged. For example, the feedback period of the matrix information may be 0.1-1 second.

FIG. 3 is a schematic flowchart of another example of a channel state information feedback method according to an embodiment of the present invention. As shown in FIG. 3, a time domain resource may be divided into basic units in units of short periods (that is, a period of vector information), and each short period may include at least one transmission time interval (TTI). It is assumed that the period in which the terminal device receives the downlink reference signal is ten 1-millisecond TTIs (a 1-millisecond TTI is equal to one subframe, and ten subframes are one radio frame), and the short period may include ten TTIs. In each short period, the terminal device feeds back an instant downlink channel status to the network device. A plurality of short periods constitute a long period. In each long period, the terminal device continuously performs channel estimation (that is, obtains a channel matrix set), and obtains a dimension reduction matrix. The dimension reduction period is fed back in a long period. In a last short period of each long period, the terminal device not only feeds back the dimension reduction matrix, but also may feed back the vector information.

In addition, it may be learned from FIG. 1 that the terminal device performs, by using a dimension reduction matrix determined in a previous period, dimension reduction on a channel matrix corresponding to a downlink reference signal received in a current period; and correspondingly, the network device determines a precoding matrix based on the dimension reduction matrix determined in the previous period and currently received vector information. That is, S110 may include:

determining, by the terminal device, the dimension reduction matrix that is of a downlink channel and that is corresponding to the second time period based on the channel matrix corresponding to the downlink reference signal that is received in the first time period. The second time period is later than the first time period, and the duration of the second time period may be equal to the duration of the first time period.

S230. The network device may determine a precoding matrix based on the matrix information and the vector information.

Specifically, the network device obtains accurate CSI to determine the precoding matrix. The network device may obtain a dimension reduction matrix $P \in C^{N_T \times N_P}$ based on the matrix information, and determine an eigenvector $V \in C^{N_P \times r}$ of a downlink equivalent channel based on the vector information. The network device may determine the precoding matrix based on $P \times V$. A high-dimension matrix is obtained by using the dimension reduction matrix and the eigenvector of the downlink equivalent channel. The precoding matrix may be the high-dimension matrix.

If the matrix information includes an index of the dimension reduction matrix, the network device may determine the dimension reduction matrix based on the index of the dimension reduction matrix and a preset dimension reduction matrix set. If the vector information includes an index of the eigenvector, the network device may determine the eigenvector based on the index of the eigenvector and a preset eigenvector set.

If the matrix information includes a quantized element obtained after an element of the dimension reduction matrix is quantized, in other words, if the matrix information is obtained by the terminal device by quantizing the element of the dimension reduction matrix, the network device first needs to recover the dimension reduction matrix corresponding to the matrix information after receiving the matrix information. Likewise, if the vector information includes a quantized element obtained after an element of the eigenvector is quantized, the network device first needs to recover the eigenvector corresponding to the vector information after receiving the vector information.

The following describes a quantization procedure of the terminal device and a recovery procedure in which the network device recovers an eigenvector based on the vector information by using an example in which a phase and an amplitude of the eigenvector of the downlink equivalent channel are separately quantized.

It is assumed that a to-be-quantized eigenvector is $V_1 \in C^{N_P}$, and $V_1$ may be represented in the following form:

$$V_1 = \begin{bmatrix} v_1 \\ \vdots \\ v_P \end{bmatrix} = \begin{bmatrix} |v_1| \\ \vdots \\ |v_P| \end{bmatrix} \odot \begin{bmatrix} e^{j\varphi_1} \\ \vdots \\ e^{j\varphi_P} \end{bmatrix},$$

where $\odot$ represents an element-wise product, $|v_i|$ and $\varphi_i$ respectively represent an amplitude and a phase of an $i^{th}$ element $v_i$, and $i=1, \ldots, P$. Calculation formulas are as follows:

$|v_i| = \sqrt{\Re\{v_i\}^2 + \mathcal{J}\{v_i\}^2}$, and $\varphi_i = a\tan 2(\Re\{v_i\}, \mathcal{J}\{v_i\})$, where $-\pi < \varphi_i \leq \pi$.

The following operation is performed:

$$\overline{V}_1 = \frac{e^{-j\varphi_1}}{|v_{max}|} V_1 = \begin{bmatrix} \overline{v}_1 \\ \vdots \\ \overline{v}_P \end{bmatrix} = \begin{bmatrix} |\overline{v}_1| \\ \vdots \\ |\overline{v}_P| \end{bmatrix} \odot \begin{bmatrix} e^{j\overline{\varphi}_1} \\ \vdots \\ e^{j\overline{\varphi}_P} \end{bmatrix},$$

where $|v_{max}| = \max_{i=1 \ldots P} |v_i|$, $|\overline{v}_i| = \frac{|v_i|}{|v_{max}|}$, and $\overline{\varphi}_i = a\tan 2(\Re\{\overline{v}_i\}, \mathcal{J}\{\overline{v}_i\})$.

Quantizing the amplitude means quantizing $|v_i|$, where $i=1, \ldots, P$. It is assumed that a quantity of bits for quantizing the amplitude is $M_A$. A quantization process may be expressed as follows:

$|\tilde{v}_i| = \min\{\text{floor}(v_i \times 2^{M_A} + 0.5), 2^{M_A} - 1\}$, where $i=1, \ldots, P$; and floor (•) indicates rounding down, and min {•,•} is used for a saturation operation.

Quantizing the phase means quantizing $\overline{\varphi}_i$, where $i=2, \ldots, P$, and $\overline{\varphi}_1 = 0$ does not need to be quantized. It is assumed that a quantity of bits for quantizing the phase is $M_B$. A quantization process may be expressed as follows:

$|\tilde{\varphi}_i| \min\{\text{floor}(\overline{\varphi}_i/(2\pi) + 0.5) \times 2^{M_B} + 0.5), 2^{M_B} - 1\}$, where $i=2, \ldots, P$.

The terminal device sends $|\tilde{v}_i|$ and $|\tilde{\varphi}_i|$ to the network device, and the network device may recover an amplitude $|\hat{v}_i|$ and a phase $\hat{\varphi}_i$ of each element, and then perform L2-norm normalization on an eigenvector $\hat{V}_1$ constituted by using the amplitude $|\overline{v}_i|$ and the phase $\hat{\varphi}_i$. A corresponding recovery process may be expressed as follows:

$\hat{\varphi}_i = \tilde{\varphi}_i \times 2^{-M_B} \times (2\pi)$, where $i=2, \ldots, P$.

Normalization of $\hat{V}_1$ is equivalent to normalization of an amplitude vector, and a recovery process of the amplitude may be expressed as follows:

$$|\hat{v}_i| = \frac{|\tilde{v}_i|}{\sqrt{\sum_{i=P}^{i=1} |\tilde{v}_i|^2}}.$$

Finally, an element-wise product is performed on a recovered amplitude and a recovered phase to obtain a recovered eigenvector:

$$\tilde{V}_1 = \begin{bmatrix} |\tilde{v}_1| \\ |\tilde{v}_2| \\ \vdots \\ |\tilde{v}_P| \end{bmatrix} \odot \begin{bmatrix} 1 \\ e^{j\hat{\varphi}_2} \\ \vdots \\ e^{j\hat{\varphi}_P} \end{bmatrix}.$$

It should be noted that the foregoing process of quantizing the eigenvector $V_1$ is only an example, and should not constitute any limitation on this embodiment of the present invention. In this embodiment of the present invention, elements of the eigenvector and/or the dimension reduction matrix may be quantized in another manner.

According to the method in this embodiment of the present invention, CSI is represented jointly by using dimension reduction information and the vector information, so that the network device can obtain accurate CSI. Further, the dimension reduction information and the vector information are respectively fed back in a long period and a short period. This helps reduce feedback overheads. In this method in this embodiment of the present invention, a good compromise can be made between CSI feedback accuracy and CSI feedback overheads.

As described above, with reference to FIG. 2 and FIG. 3, the terminal device may send the dimension reduction information and the vector information to the network device, so that the network device obtains relatively accurate CSI. Further, the terminal device may respectively feed back the dimension reduction information and the vector information in a long period and short period, thereby reducing CSI feedback overheads.

Further, there is no channel reciprocity between an uplink channel and a downlink channel in an FDD system and an uncalibrated TDD system. Therefore, a channel status of a current downlink channel or a channel status of a downlink channel at a neighboring moment cannot be directly estimated based on a current uplink reference signal. Actually, the FDD system (in a period of time) and the uncalibrated TDD are correlated. In this embodiment of the present invention, CSI is represented jointly by using the dimension reduction matrix and the eigenvector. Because there is no channel reciprocity between an uplink channel and a downlink channel in the FDD system and the uncalibrated TDD system, the terminal device needs to send the vector information of the eigenvector to the network device. However, for a specific correlation between the FDD system and the uncalibrated TDD system, the network device may send a downlink reference signal based on the dimension reduction matrix, so that the terminal device does not need to feed back matrix information of the dimension reduction matrix. The following describes the method in detail.

FIG. 4 is a schematic flowchart of still another example of a channel state information feedback method according to an embodiment of the present invention.

As shown in FIG. 4, the method 300 may include the following step:

S310. A network device sends a downlink reference signal based on a dimension reduction matrix; and correspondingly, a terminal device receives the downlink reference signal sent by the network device based on the dimension reduction matrix.

A first dimension of the dimension reduction matrix is the same as a quantity of transmit antenna ports of the network device, and a second dimension of the dimension reduction matrix is less than the first dimension of the dimension reduction matrix.

Specifically, it is assumed that a precoding matrix used to send a downlink reference signal is $A \in C^{N_T \times N_R}$. If the precoding matrix A sends a downlink reference signal, a channel matrix obtained by the terminal device is $H \in C^{N_R \times N_T}$. The channel matrix H is a high-dimension channel matrix. If a downlink reference signal is sent based on a dimension reduction matrix $P \in C^{N_T \times N_P}$, a channel matrix obtained by the terminal device is $\overline{H} \in C^{N_R \times N_P}$. That is, a channel estimation result obtained by the terminal device by estimating the downlink reference signal is a matrix obtained after dimension reduction.

In this method, the network device may map, by using a virtual antenna mapping method, downlink reference signals of $N_S$ ports to $N_T$ antenna ports for sending, where the mapping matrix is transposition of the dimension reduction matrix.

The method 300 may further include the following steps:

S301. The terminal device sends an uplink reference signal to the network device; and correspondingly, the network device receives the uplink reference signal sent by the terminal device.

S302. The network device determines the dimension reduction matrix based on channel matrices corresponding to uplink reference signals received in a first time period.

Specifically, the network device may determine the dimension reduction matrix of a downlink channel based on the channel matrices corresponding to the uplink reference signals received by the network device in the first time period. The dimension reduction matrix may be used to perform dimension reduction on a channel matrix of the downlink channel. For ease of description, "the channel matrices corresponding to the uplink reference signals received by the network device in the first time period" may be denoted as a "channel matrix set". The network device may determine the dimension reduction matrix based on the channel matrix set.

S320. The terminal device sends vector information of an eigenvector of a downlink equivalent channel to the network device based on a channel matrix corresponding to the downlink reference signal; and correspondingly, the network device receives the vector information.

It should be noted that the channel matrix corresponding to the downlink reference signal is a channel matrix obtained after dimension reduction (corresponding to the equivalent matrix corresponding to the foregoing downlink reference signal).

The method may further include the following step:

S303. The terminal device determines the eigenvector of the downlink equivalent channel based on the channel matrix corresponding to the downlink reference signal.

S330. The network device determines a precoding matrix based on the dimension reduction matrix and the vector information.

Optionally, a period in which the network device determines the dimension reduction matrix is longer than a period in which the network device receives the vector information. For example, the period in which the network device determines the dimension reduction matrix is 0.1-1 second, and the period in which the network device receives the vector information is 5-10 milliseconds.

For ease of description, a period of determining the dimension reduction matrix may be denoted as a first period, and a period of receiving the vector information may be denoted as a second period.

A dimension reduction matrix determined by the network device in an $i^{th}$ first period may be used to jointly represent CSI with vector information received in an $(i+1)^{th}$ first period.

For example, it is assumed that a period in which the network device determines the dimension reduction matrix is 1 second, and the network device determines the dimension reduction matrix at a moment T. For brevity, "the dimension reduction matrix determined at the moment T" may be denoted as a "first dimension reduction matrix". The first dimension reduction matrix may be used to represent CSI at a corresponding moment with vector information received in 0.1 second after the moment T, and the first dimension reduction matrix may be further used to represent CSI at a corresponding moment with vector information received in 0.2 second after the moment T.

In the method 300, the network device sends the downlink reference signal based on the dimension reduction matrix, and the terminal device estimates the downlink reference signal to obtain a channel matrix that is essentially an equivalent matrix. Compared with the method 200, in this method, the terminal device does not need to perform dimension reduction on the channel matrix corresponding to the downlink reference signal, and the terminal device does not need to feed back matrix information to the network device.

It should be understood that, in the method 200 and the method 300, the dimension reduction matrix and the eigenvector jointly represent CSI, and steps and operations performed in the method 200 and the method 300 are similar. For related descriptions in the method 300, refer to related descriptions in the method 200 (for example, for detailed descriptions of S301, refer to related descriptions of S202). For brevity, details are not described herein again.

In the prior art, CSI is represented by using a precoding matrix selected from a codebook. In comparison, in the method in this embodiment of the present invention, CSI is represented by using a dimension reduction matrix (matrix information) and an eigenvector (vector information). This helps the network device obtain accurate CSI. Further, compared with a manner in which a high-dimension channel matrix is directly fed back, in this embodiment of the present invention, the terminal device sends the eigenvector of the downlink equivalent channel. This can reduce feedback overheads. According to the method in this embodiment of the present invention, CSI can be represented by using a dimension reduction matrix and an eigenvector, so that a good compromise can be made between CSI feedback overheads and CSI feedback accuracy. This helps the network device obtain a higher gain of spatial multiplexing.

The foregoing describes in detail the channel state information feedback method in the embodiments of the present invention with reference to FIG. 1 to FIG. 4. The following describes in detail a terminal device and a network device in the embodiments of the present invention with reference to FIG. 5 to FIG. 12.

Figure 5:
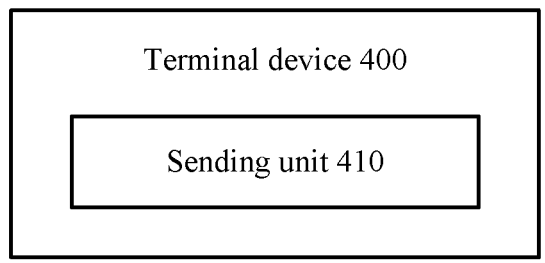
FIG. 5 is a schematic block diagram of an example of a terminal device according to an embodiment of the present invention.

FIG. 5 is a schematic block diagram of an example of a terminal device according to an embodiment of the present invention. It should be understood that a terminal device 400 shown in FIG. 5 is merely an example. The terminal device 400 in this embodiment of the present invention may further include another module or unit, or a module with a function similar to that of each module in FIG. 5, or may not necessarily include all modules in FIG. 5.

As shown in FIG. 5, the terminal device 400 includes:

a sending unit 410, where the sending unit 410 is configured to: send matrix information of a dimension reduction matrix to a network device, where a first dimension of the dimension reduction matrix is the same as a quantity of transmit antenna ports of the network device, and a second dimension of the dimension reduction matrix is less than the first dimension of the dimension reduction matrix; and send vector information of an eigenvector of a downlink equivalent channel to the network device, where the eigenvector of the downlink equivalent channel is obtained based on the dimension reduction matrix, where the matrix information includes a matrix index of the dimension reduction matrix, or the matrix information includes information obtained by the terminal device by quantizing an element of the dimension reduction matrix; and the vector information includes an index of the eigenvector, or the vector information includes information obtained by the terminal device by quantizing an element of the eigenvector.

Optionally, the sending unit 410 is specifically configured to: send the matrix information to the network device over an uplink data channel; and/or send the vector information to the network device over an uplink data channel.

Optionally, the dimension reduction matrix is determined by the terminal device 400 based on channel matrices corresponding to downlink reference signals received in a first time period, energy of a subspace corresponding to the dimension reduction matrix in the first time period is highest among energy of a plurality of subspaces corresponding to the downlink channel in a same dimension, and orthogonality is met between column vectors of the dimension reduction matrix.

Optionally, the terminal device 400 further includes a first processing unit, configured to determine the dimension reduction matrix based on the channel matrices corresponding to the downlink reference signals received in the first time period.

Optionally, the first processing unit is specifically configured to: calculate a first covariance matrix based on the channel matrices corresponding to the downlink reference signals received in the first time period, where the first covariance matrix is used to represent a statistical feature that is of the downlink channel and that is corresponding to the first time period; and calculate the dimension reduction matrix based on the first covariance matrix.

Optionally, the first processing unit is specifically configured to: calculate a covariance matrix of each of the channel matrices corresponding to the downlink reference signals received by the terminal device 400 in the first time period; average covariance matrices corresponding to downlink reference signals received at a same moment, to obtain a plurality of second covariance matrices, where the plurality of second covariance matrices are in a one-to-one correspondence with a plurality of moments included in the first time period; and perform averaging or time-domain filtering on the plurality of second covariance matrices to obtain the first covariance matrix.

Optionally, the first processing unit is specifically configured to determine the dimension reduction matrix from a preset dimension reduction matrix set based on the channel matrices corresponding to the downlink reference signals received in the first time period, where the matrix information of the dimension reduction matrix includes an index of the dimension reduction matrix in the preset dimension reduction matrix set.

Optionally, all columns of the dimension reduction matrix are corresponding to a same beam directivity pattern.

Optionally, the terminal device 400 further includes a second processing unit, configured to perform, based on the dimension reduction matrix, dimension reduction on channel matrices corresponding to downlink reference signals received at a first moment, to determine eigenvectors of downlink equivalent channels corresponding to the downlink reference signals received at the first moment.

Optionally, the second processing unit is specifically configured to: perform, based on the dimension reduction matrix, dimension reduction on the channel matrices corresponding to the downlink reference signals received at the first moment, to obtain equivalent matrices corresponding to the downlink reference signals received at the first moment; calculate a covariance matrix of each of the equivalent matrices corresponding to the downlink reference signals received at the first moment; average covariance matrices corresponding to a first frequency domain resource area to obtain a third covariance matrix corresponding to the first resource area, where the covariance matrices corresponding to the first frequency domain resource area include the covariance matrices of the equivalent matrices corresponding to the downlink reference signals received at the first moment in the first frequency domain resource area; and determine the eigenvectors of the downlink equivalent channels in the first frequency domain resource area based on the third covariance matrix, where the first frequency domain resource area includes a full bandwidth or a bandwidth part.

Optionally, the eigenvectors of the downlink equivalent channels include r eigenvectors, where r is configured by the network device or r is the same as a quantity of data flows supported by the terminal device 400, an eigenvalue corresponding to any one of the r eigenvectors is greater than or equal to an eigenvalue corresponding to any eigenvector other than the r eigenvectors in the eigenvectors of the downlink equivalent channels, and r≥1.

Optionally, a period in which the sending unit 410 sends the matrix information is longer than a period in which the sending unit 410 sends the vector information.

It should also be understood that the foregoing and other operations and/or functions of the units of the terminal device shown in FIG. 5 in this embodiment of the present invention are separately used to implement corresponding procedures of the method 200. For brevity, details are not described herein again.

Figure 6:
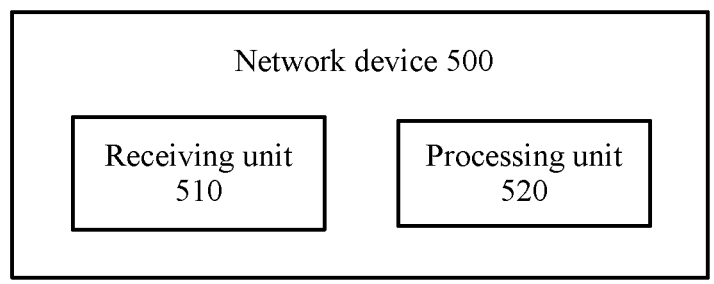
FIG. 6 is a schematic block diagram of an example of a network device according to an embodiment of the present invention.

FIG. 6 is a schematic block diagram of an example of a network device according to an embodiment of the present invention. It should be understood that a network device 500 shown in FIG. 6 is merely an example. The network device 500 in this embodiment of the present invention may further include another module or unit, or a unit with a function similar to that of each module in FIG. 6, or may not necessarily include all units in FIG. 6.

As shown in FIG. 6, the network device 500 includes: a receiving unit 510, where the receiving unit 510 is configured to: receive matrix information that is of a dimension reduction matrix and that is sent by a terminal device, where a first dimension of the dimension reduction matrix is the same as a quantity of transmit antenna ports of the network device 500, and a second dimension of the dimension reduction matrix is less than the first dimension of the dimension reduction matrix; and receive vector information that is of an eigenvector of a downlink equivalent channel and that is sent by the terminal device; and a processing unit 520, configured to determine a precoding matrix based on the matrix information and the vector information, where the matrix information includes a matrix index of the dimension reduction matrix, or the matrix information includes information obtained by the terminal device by quantizing an element of the dimension reduction matrix; and the vector information includes an index of the eigenvector, or the vector information includes information obtained by the terminal device by quantizing an element of the eigenvector.

Optionally, the receiving unit 510 is specifically configured to: receive, over an uplink data channel, the matrix information sent by the terminal device; and/or receive, over an uplink data channel, the vector information sent by the terminal device 500.

Optionally, a period in which the receiving unit 510 receives the matrix information is longer than a period in which the receiving unit 510 receives the vector information.

It should also be understood that the foregoing and other operations and/or functions of the units of the network device shown in FIG. 6 are separately used to implement corresponding procedures of the method 200. For brevity, details are not described herein again.

Figure 7:
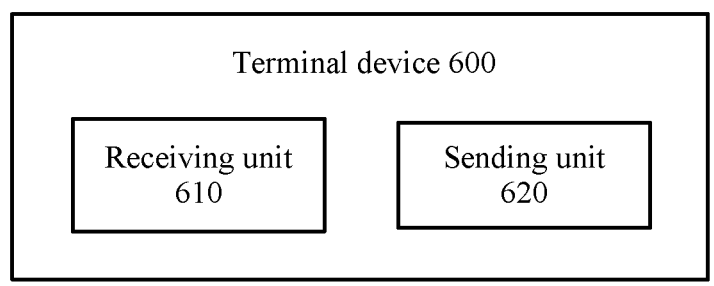
FIG. 7 is a schematic block diagram of another example of a terminal device according to an embodiment of the present invention.

FIG. 7 is a schematic block diagram of another example of a terminal device according to an embodiment of the present invention. It should be understood that a terminal device 600 shown in FIG. 7 is merely an example. The terminal device 600 in this embodiment of the present invention may further include another unit, or a unit with a function similar to that of each module in FIG. 7, or may not necessarily include all units in FIG. 7.

As shown in FIG. 7, the terminal device 600 includes: a receiving unit 610, where the receiving unit 610 is configured to receive downlink reference signals sent by a network device based on a dimension reduction matrix, where a first dimension of the dimension reduction matrix is the same as a quantity of transmit antenna ports of the network device, and a second dimension of the dimension reduction matrix is less than the first dimension of the dimension reduction matrix; and a sending unit 620, configured to send vector information of eigenvectors of downlink equivalent channels to the network device based on channel matrices corresponding to the downlink reference signals received by the receiving unit 610.

Optionally, the terminal device 600 further includes a processing unit. The processing unit is configured to: calculate the eigenvectors of the downlink equivalent channels based on the channel matrices corresponding to the downlink reference signals, and obtain the vector information by quantizing the eigenvector.

Optionally, the sending unit 620 is specifically configured to send the vector information to the network device over an uplink data channel.

Optionally, the processing unit is specifically configured to: calculate a covariance matrix of each of the channel matrices corresponding to the downlink reference signals; average covariance matrices corresponding to a first frequency domain resource area to obtain a third covariance matrix, where the covariance matrices corresponding to the first frequency domain resource area include the covariance matrices of the channel matrices corresponding to the downlink reference signals in the first frequency domain resource area, and the first frequency domain resource area includes a full bandwidth or a bandwidth part; and determine the eigenvectors of the downlink equivalent channels in the first frequency domain resource area based on the third covariance matrix, where the first frequency domain resource area includes the full bandwidth or the bandwidth part.

Optionally, the eigenvectors of the downlink equivalent channels include r eigenvectors, where r is configured by the network device or r is the same as a quantity of data flows supported by the terminal device, an eigenvalue corresponding to any one of the r eigenvectors is greater than or equal to an eigenvalue corresponding to any eigenvector other than the r eigenvectors in the eigenvectors of the downlink equivalent channels, and r≥1.

It should also be understood that the foregoing and other operations and/or functions of the units of the terminal device 600 shown in FIG. 7 in this embodiment of the present invention are separately used to implement corresponding procedures of the method 300. For brevity, details are not described herein again.

Figure 8:
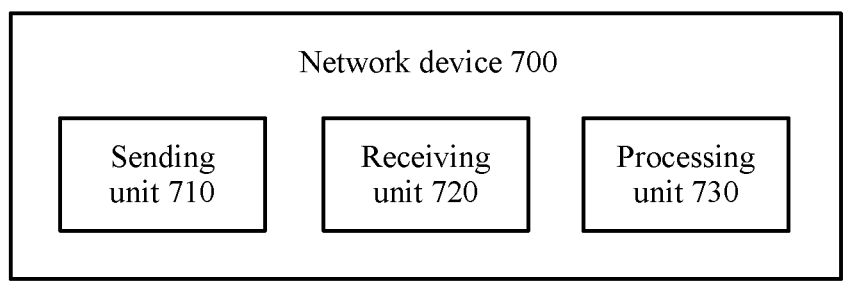
FIG. 8 is a schematic block diagram of another example of a network device according to an embodiment of the present invention.

FIG. 8 is a schematic block diagram of another example of a network device according to an embodiment of the present invention. It should be understood that a network device 700 shown in FIG. 8 is merely an example. The network device 700 in this embodiment of the present invention may further include another unit or module, or a unit with a function similar to that of each module in FIG. 8, or may not necessarily include all units in FIG. 8.

As shown in FIG. 8, the network device 700 includes:

a sending unit 710, configured to send a downlink reference signal based on a dimension reduction matrix, where a first dimension of the dimension reduction matrix is the same as a quantity of transmit antenna ports of the network device 700, and a second dimension of the dimension reduction matrix is less than the first dimension of the dimension reduction matrix; a receiving unit 720, configured to receive vector information that is of an eigenvector of a downlink equivalent channel and that is sent by the terminal device based on the downlink reference signal; and a processing unit 730, configured to determine a precoding matrix based on the dimension reduction matrix and the vector information.

Optionally, the receiving unit 720 is specifically configured to receive the vector information over an uplink data channel.

Optionally, the processing unit 730 is further configured to determine the dimension reduction matrix based on channel matrices corresponding to uplink reference signals received in a first time period.

Optionally, the processing unit 730 is specifically configured to: calculate a first covariance matrix based on the channel matrices corresponding to the uplink reference signals received in the first time period, where the first covariance matrix is used to represent a statistical feature that is of an uplink channel and that is corresponding to the first time period; and calculate the dimension reduction matrix based on the first covariance matrix.

Optionally, the processing unit 730 is specifically configured to: calculate a covariance matrix of each of the channel matrices corresponding to the uplink reference signals received by the receiving unit 720 in the first time period; average covariance matrices corresponding to uplink reference signals received at a same moment, to obtain a plurality of second covariance matrices, where the plurality of second covariance matrices are in a one-to-one correspondence with a plurality of moments included in the first time period; and perform averaging or time-domain filtering on the plurality of second covariance matrices to obtain the first covariance matrix.

Optionally, a period in which the receiving unit 730 determines the dimension reduction matrix is longer than a period in which the receiving unit 720 receives the vector information.

It should also be understood that the foregoing and other operations and/or functions of the units of the terminal device 700 shown in FIG. 8 in this embodiment of the present invention are separately used to implement corresponding procedures of the method 300. For brevity, details are not described herein again.

Figure 9:
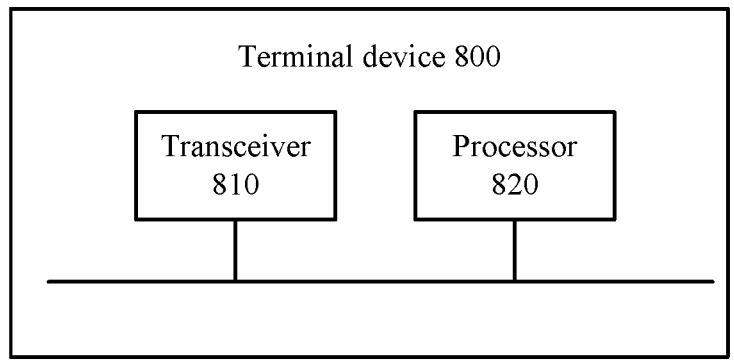
FIG. 9 is a schematic block diagram of still another example of a terminal device according to an embodiment of the present invention.

FIG. 9 is a schematic block diagram of still another example of a terminal device according to an embodiment of the present invention. The terminal device 800 may be corresponding to the terminal device described in the method 200 (for example, may be configured as the terminal device or may be the terminal device), and modules or units in the terminal device 800 are separately used to perform actions or processing processes performed by the terminal device in the method 200. To avoid repetition, details are not described herein.

In this embodiment of the present invention, the terminal device 800 may include a transceiver 810 and a processor 820. The processor is connected to the transceiver. Optionally, the device further includes a memory. The memory may be integrated into the processor, or may be independent of the processor. The memory may be configured to store an instruction. The processor is configured to execute the instruction stored in the memory, so as to control the transceiver to send information or a signal. The processor, the memory, and the transceiver may communicate with each other by using an internal connection path, to transmit control and/or data signals.

The processing units in the terminal device 400 shown in FIG. 5 may be corresponding to the processor 820, and the sending unit and/or the receiving unit in the terminal device shown in FIG. 5 may be corresponding to the transceiver.

Figure 10:
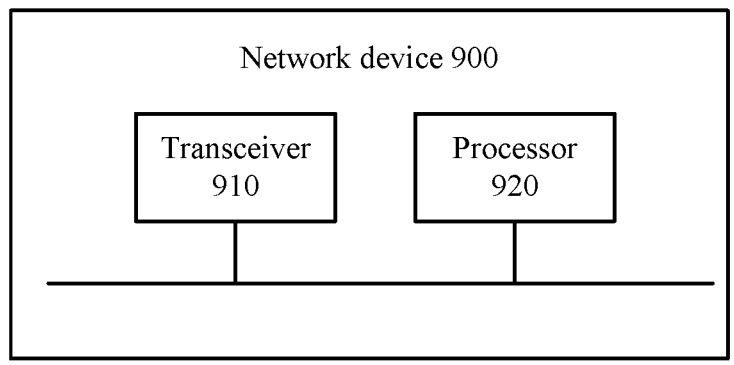
FIG. 10 is a schematic block diagram of still another example of a network device according to an embodiment of the present invention.

FIG. 10 is a schematic block diagram of still another example of a network device according to an embodiment of the present invention. The network device 900 may be corresponding to the network device 900 described in the method 200 (for example, may be configured as the network device or may be the network device), and modules or units in the network device 900 are separately used to perform actions or processing processes performed by the network device 900 in the method 200. To avoid repetition, details are not described herein.

In this embodiment of the present invention, the network device 900 may include a transceiver 910 and a processor 920. The processor is connected to the transceiver. Optionally, the device further includes a memory. The memory may be integrated into the processor, or may be independent of the processor. The memory may be configured to store an instruction. The processor is configured to execute the instruction stored in the memory, so as to control the transceiver to send information or a signal. The processor, the memory, and the transceiver may communicate with each other by using an internal connection path, to transmit control and/or data signals.

The processing units in the network device 500 shown in FIG. 6 may be corresponding to the processor 920, and the sending unit and/or the receiving unit in the network device 500 shown in FIG. 6 may be corresponding to the transceiver 910.

Figure 11:
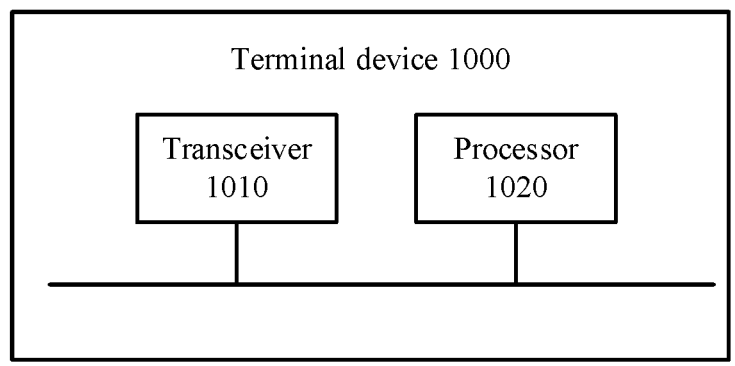
FIG. 11 is a schematic block diagram of yet another example of a terminal device according to an embodiment of the present invention.

FIG. 11 is a schematic block diagram of yet another example of a terminal device according to an embodiment of the present invention. The terminal device 1000 may be corresponding to the terminal device described in the method 300 (for example, may be configured as the terminal device or may be the terminal device), and modules or units in the terminal device 1000 are separately used to perform actions or processing processes performed by the terminal device in the method 300. To avoid repetition, details are not described herein.

In this embodiment of the present invention, the terminal device 1000 may include a transceiver 1010 and a processor 1020. The processor is connected to the transceiver. Optionally, the device further includes a memory. The memory may be integrated into the processor, or may be independent of the processor. The memory may be configured to store an instruction. The processor is configured to execute the instruction stored in the memory, so as to control the transceiver to send information or a signal. The processor, the memory, and the transceiver may communicate with each other by using an internal connection path, to transmit control and/or data signals.

The processing unit in the terminal device shown in FIG. 7 may be corresponding to the processor 1020, and the sending unit and/or the receiving unit in the terminal device shown in FIG. 7 may be corresponding to the transceiver 1010.

Figure 12:
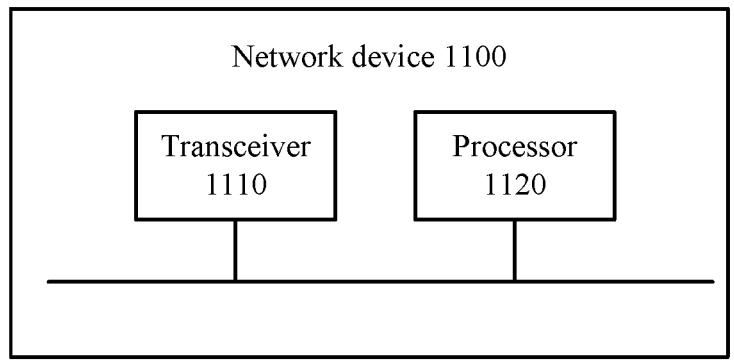
FIG. 12 is a schematic block diagram of yet another example of a network device according to an embodiment of the present invention.

FIG. 12 is a schematic block diagram of yet another example of a network device according to an embodiment of the present invention. The network device 1100 may be corresponding to the network device described in the method 300 (for example, may be configured as the network device or may be the network device), and modules or units in the network device 1100 are separately used to perform actions or processing processes performed by the network device in the method 300. To avoid repetition, details are not described herein.

The network device 1100 may include a transceiver 1110 and a processor 1120. The processor is connected to the transceiver. Optionally, the device further includes a memory. The memory may be integrated into the processor, or may be independent of the processor. The memory may be configured to store an instruction. The processor is configured to execute the instruction stored in the memory, so as to control the transceiver to send information or a signal. The processor, the memory, and the transceiver may communicate with each other by using an internal connection path, to transmit control and/or data signals.

The processing units in the network device 700 shown in FIG. 8 may be corresponding to the processor 1120, and the sending unit and/or the receiving unit in the network device 700 shown in FIG. 8 may be corresponding to the transceiver 1110.

It should be noted that the foregoing method embodiments in the embodiments of the present invention may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly performed and accomplished through a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of an example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory described in this specification aims to include but is not limited to these memories and any memory of another proper type.

The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel state information feedback method carried out by a terminal device, wherein the method comprises:
   determining a dimension reduction matrix;
   sending a matrix information of the dimension reduction matrix to a network device, wherein a first dimension of the dimension reduction matrix equals a quantity of transmit antenna ports of the network device, and wherein a second dimension of the dimension reduction matrix is less than the first dimension of the dimension reduction matrix; and
   sending a vector information of an eigenvector of a downlink equivalent channel to the network device, wherein the eigenvector of the downlink equivalent channel is obtained based on the dimension reduction matrix, wherein the matrix information comprises a matrix index of the dimension reduction matrix or an information obtained by the terminal device by quantizing an element of the dimension reduction matrix,
   wherein the vector information comprises an index of the eigenvector or an information obtained by the terminal device by quantizing an element of the eigenvector,
   wherein the dimension reduction matrix is determined, during the determining, based on a channel matrices corresponding to a downlink reference signals received in a first time period,
   wherein energy of a subspace corresponding to the dimension reduction matrix in the first time period is highest among a plurality of subspaces corresponding to the downlink channel in a same dimension, and
   wherein orthogonality is met between column vectors of the dimension reduction matrix.

2. The method according to claim 1, wherein at least one of the matrix information of the dimension reduction matrix and the vector information of the eigenvector is sent over an uplink data channel.

3. The method according to claim 1, wherein a period in which the terminal device sends the matrix information is longer than a period in which the terminal device sends the vector information.

4. The method according to claim 1, wherein the determining the dimension reduction matrix comprises:
   determining the dimension reduction matrix based on the channel matrices corresponding to the downlink reference signals received in the first time period.

5. The method according to claim 4, wherein the determining the dimension reduction matrix comprises:
   calculating a first covariance matrix based on the channel matrices corresponding to the downlink reference signals, wherein the first covariance matrix is used to represent a statistical feature that is of the downlink channel and that corresponds to the first time period; and
   calculating the dimension reduction matrix based on the first covariance matrix.

6. The method according to claim 4, wherein the determining the dimension reduction matrix comprises:
   determining the dimension reduction matrix from a preset dimension reduction matrix set based on the channel matrices corresponding to the downlink reference signals received in the first time period, wherein the matrix information of the dimension reduction matrix comprises a matrix index of the dimension reduction matrix in the preset dimension reduction matrix set.

7. The method according to claim 6, wherein all columns of the dimension reduction matrix correspond to a same beam directivity pattern.

8. A terminal device, comprising:
   a processor; and
   a non-transitory computer-readable storage medium coupled to the processor and storing programming instructions for execution by the processor, the programming instructions instruct the processor to carry out a channel feedback method comprising:
   determining a dimension reduction matrix;
   sending a matrix information of the dimension reduction matrix to a network device, wherein a first dimension of the dimension reduction matrix equals a quantity of transmit antenna ports of the network device, and wherein a second dimension of the dimension reduction matrix is less than the first dimension of the dimension reduction matrix; and
   sending a vector information of an eigenvector of a downlink equivalent channel to the network device, wherein the eigenvector of the downlink equivalent channel is obtained based on the dimension reduction matrix, wherein the matrix information comprises a matrix index of the dimension reduction matrix or an information obtained by the terminal device by quantizing an element of the dimension reduction matrix;
   wherein the vector information comprises an index of the eigenvector or an information obtained by the terminal device by quantizing an element of the eigenvector,
   wherein the dimension reduction matrix is determined, during the determining, based on a channel matrices corresponding to a downlink reference signals received in a first time period,
   wherein energy of a subspace corresponding to the dimension reduction matrix in the first time period is highest among a plurality of subspaces corresponding to the downlink channel in a same dimension, and
   wherein orthogonality is met between column vectors of the dimension reduction matrix.

9. The terminal device according to claim 8, wherein the method further comprises:
performing, based on the dimension reduction matrix, a dimension reduction on channel matrices corresponding to downlink reference signals received at a first moment, to determine eigenvectors of downlink equivalent channels corresponding to the downlink reference signals received at the first moment.

10. The terminal device according to claim 8, wherein at least one of the matrix information of the dimension reduction matrix and the vector information of the eigenvector is sent over an uplink data channel.

11. The terminal device according to claim 8, wherein a first period length for the sending the matrix information is longer than a second period length for the sending the vector information.

12. The terminal device according to claim 8, wherein the determining the dimension reduction matrix comprises:
determining the dimension reduction matrix based on the channel matrices corresponding to the downlink reference signals received in the first time period.

13. The terminal device according to claim 12, wherein the determining the dimension reduction matrix comprises:
calculating a first covariance matrix based on the channel matrices corresponding to the downlink reference signals, wherein the first covariance matrix is used to represent a statistical feature that is of the downlink channel and that corresponds to the first time period; and
calculating the dimension reduction matrix based on the first covariance matrix.

14. The terminal device according to claim 12, wherein the determining the dimension reduction matrix comprises:
determining the dimension reduction matrix from a preset dimension reduction matrix set based on the channel matrices corresponding to the downlink reference signals received in the first time period, wherein the matrix information of the dimension reduction matrix comprises a matrix index of the dimension reduction matrix in the preset dimension reduction matrix set.

15. The terminal device according to claim 14, wherein all columns of the dimension reduction matrix correspond to a same beam directivity pattern.

* * * * *